United States Patent
Inomata

(10) Patent No.: US 10,216,261 B2
(45) Date of Patent: Feb. 26, 2019

(54) METHOD OF SUPPRESSING VR SICKNESS, SYSTEM FOR EXECUTING THE METHOD, AND INFORMATION PROCESSING DEVICE

(71) Applicant: COLOPL, Inc., Tokyo (JP)

(72) Inventor: Atsushi Inomata, Kanagawa (JP)

(73) Assignee: COLOPL, INC., Tokyo (JP)

(*) Notice: Subject to any disclaimer, the term of this patent is extended or adjusted under 35 U.S.C. 154(b) by 0 days.

(21) Appl. No.: 15/798,217

(22) Filed: Oct. 30, 2017

(65) Prior Publication Data
US 2018/0120929 A1 May 3, 2018

(30) Foreign Application Priority Data
Oct. 31, 2016 (JP) ................................. 2016-213140

(51) Int. Cl.
| | |
|---|---|
| G06T 15/20 | (2011.01) |
| G06F 3/01 | (2006.01) |
| G06T 3/20 | (2006.01) |
| G06F 3/0481 | (2013.01) |

(52) U.S. Cl.
CPC .............. *G06F 3/011* (2013.01); *G06F 3/013* (2013.01); *G06F 3/04815* (2013.01); *G06T 3/20* (2013.01); *G06T 15/20* (2013.01); *G06F 3/014* (2013.01)

(58) Field of Classification Search
CPC ...... G06F 3/011; G06F 3/013; G06F 3/04815; G06F 3/014; G06T 3/20; G06T 15/20
See application file for complete search history.

(56) References Cited

U.S. PATENT DOCUMENTS

| | | | |
|---|---|---|---|
| 5,742,331 A | * | 4/1998 | Uomori ............... H04N 13/302 348/51 |
| 6,317,151 B1 | | 11/2001 | Ohsuga et al. |
| 2016/0282619 A1 | | 9/2016 | Oto et al. |

FOREIGN PATENT DOCUMENTS

| | | |
|---|---|---|
| JP | 8-292394 A | 11/1996 |
| JP | 11-32284 A | 2/1999 |
| JP | 5869177 B1 | 2/2016 |
| JP | 2017-54201 A | 3/2017 |
| WO | 2015068656 A1 | 5/2015 |

OTHER PUBLICATIONS

Office Action in JP Application No. 2016-213140, dated Sep. 5, 2017, 7pp.

* cited by examiner

*Primary Examiner* — Robert J Craddock
(74) *Attorney, Agent, or Firm* — Hauptman Ham, LLP

(57) ABSTRACT

A method includes defining a virtual space including a virtual camera. The method further includes displaying on a head-mounted device a field of view in the virtual space based on a location of the virtual camera in the virtual space. The method further includes moving the field of view by updating the image displayed on the head-mounted device. Moving of the field of view includes moving the field of view at a first speed. Moving of the field of view further includes moving the field of view at a second speed slower than the first speed.

19 Claims, 17 Drawing Sheets

METHOD OF SUPPRESSING VR SICKNESS, SYSTEM FOR EXECUTING THE METHOD, AND INFORMATION PROCESSING DEVICE

RELATED APPLICATIONS

The present application claims priority to Japanese Application Number 2016-213140, filed Oct. 31, 2016, the disclosure of which is hereby incorporated by reference herein in its entirety.

BACKGROUND

This disclosure relates to a technology of providing virtual reality, and more specifically, to a technology of reducing visually induced motion sickness in virtual reality.

There is known a technology of providing virtual reality with use of a head-mounted device (HMD). When virtual reality is provided, visually induced motion sickness called virtual reality (VR) sickness may be caused. Therefore, a technology of reducing this VR sickness improves a VR experience.

Regarding a technology of reducing VR sickness, for example, in Japanese Patent No. 5869177, there is described a technology of "generating an image while suppressing the amount of information to be visually recognized by a wearer of a head-mounted display when a visual-field image of a virtual space to which a user is immersed is provided to the HMD" (see [Abstract]).

In WO 2015/068656 A1, there is described a technology of "generating an image to be displayed on a head-mounted display by using information on a position and a rotation acquired at a given time, and correcting the generated image by using information on the position and rotation updated at a separate time" (see [Abstract]).

One cause of VR sickness is said to be the occurrence of a difference between a sense expected by the user based on a memory actually experienced by the user and the sense actually obtained in the virtual space (sensory conflict theory). As a result, VR sickness tends to particularly occur when a field of view of the user in the virtual space is moved. Therefore, there has been proposed a technology of suppressing VR sickness by instantaneously moving the field of view of the user to his or her intended destination in order to prevent the user from recognizing a movement process.

However, a method of instantaneously moving the field of view of the user to his or her intended destination involves movements that would be impossible in a real space, and as a result, a sense of immersion of the user in the virtual space is reduced. Therefore, a technology for suppressing VR sickness (visually induced motion sickness) when providing a virtual space, while ensuring the sense of immersion of the user in the virtual space would improve the VR experience.

SUMMARY

This disclosure has been made in order to help solve problems such as those described above, and an object of at least one aspect of this disclosure to provide a method of suppressing VR sickness (visually induced motion sickness) when providing a virtual space, while ensuring a sense of immersion in the virtual space by a user. An object of at least one aspect of this disclosure is to provide a system for suppressing VR sickness when providing a virtual space, while ensuring a sense of immersion in the virtual space by a user.

According to at least one embodiment of this disclosure, there is provided a method to be executed by a computer to provide a virtual space to a head-mounted device. The method includes defining a virtual space; providing to a user of the head-mounted device a field of view in the virtual space by displaying an image on the head-mounted device. The method further includes moving the field of view of the user by updating the image to be displayed on the head-mounted device. The moving of the field of view includes moving the field of view at a first speed. The moving of the field of view further includes moving the field of view at a second speed slower than the first speed.

The above-mentioned and other objects, features, aspects, and advantages of the disclosure may be made clear from the following detailed description of this disclosure, which is to be understood in association with the attached drawings.

DETAILED DESCRIPTION

Now, with reference to the drawings, at least one embodiment of this disclosure is described in detail. In the following description, like components are denoted by like reference symbols. The same applies to the names and functions of those components. Therefore, detailed description of those components is not repeated.

[Configuration of HMD System]

Figure 1:
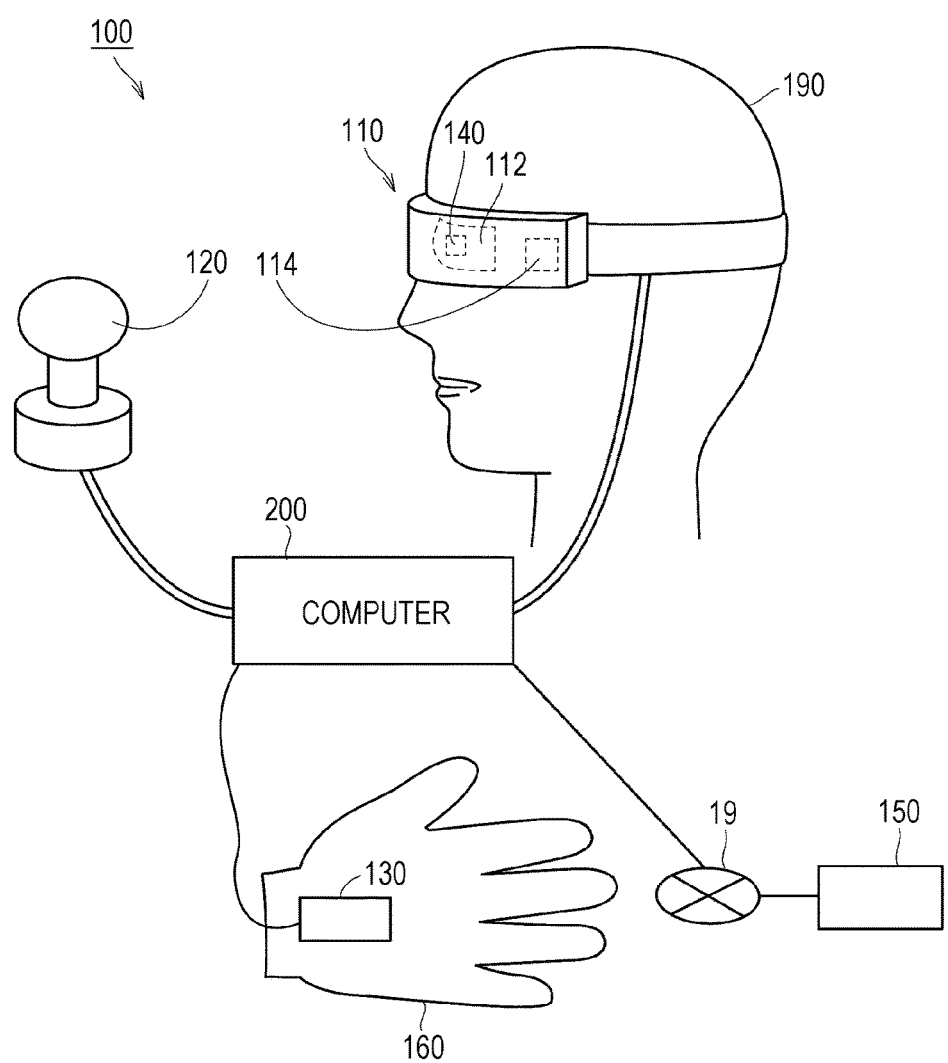
FIG. 1 is a diagram of an overview of a configuration of an HMD system of at least one embodiment of this disclosure.

With reference to FIG. 1, a configuration of a head-mounted device (HMD) system 100 is described. FIG. 1 is a diagram of an overview of the configuration of the HMD system 100 of at least one embodiment of this disclosure. In at least one aspect, the HMD system 100 is provided as a system for household use or a system for professional use. An HMD may include both of a so-called head-mounted display including a monitor and a head-mounted device to which a smart phone or other terminals having a monitor can be mounted.

The HMD system 100 includes an HMD 110, an HMD sensor 120, a controller 160, and a computer 200. The HMD 110 includes a monitor 112 and an eye gaze sensor 140. The controller 160 may include a motion sensor 130.

In at least one aspect, the computer 200 can be connected to a network 19, for example, the Internet, and can communicate to/from a server 150 or other computers connected to the network 19. In another aspect, the HMD 110 may include a sensor 114 instead of the HMD sensor 120.

The HMD 110 may be worn on a head of a user to provide a virtual space to the user during operation. More specifically, the HMD 110 displays each of a right-eye image and a left-eye image on the monitor 112. When each eye of the user visually recognizes each image, the user may recognize the image as a three-dimensional image based on the parallax of both the eyes.

The monitor 112 is achieved as, for example, a non-transmissive display device. In at least one aspect, the monitor 112 is arranged on a main body of the HMD 110 so as to be positioned in front of both the eyes of the user. Therefore, when the user visually recognizes the three-dimensional image displayed on the monitor 112, the user can be immersed in the virtual space. According to at least one embodiment of this disclosure, the virtual space includes, for example, a background, objects that can be operated by the user, and menu images that can be selected by the user. According to at least one embodiment of this disclosure, the monitor 112 may be achieved as a liquid crystal monitor or an organic electroluminescence (EL) monitor included in a so-called smart phone or other information display terminals.

In at least one aspect, the monitor 112 may include a sub-monitor for displaying a right-eye image and a sub-monitor for displaying a left-eye image. In at least one aspect, the monitor 112 may be configured to integrally display the right-eye image and the left-eye image. In this case, the monitor 112 includes a high-speed shutter. The high-speed shutter operates so as to enable alternate display of the right-eye image and the left-eye image so that only one of the eyes can recognize the image.

In at least one aspect, the HMD 110 includes a plurality of light sources (not shown). Each light source is achieved by, for example, a light emitting diode (LED) configured to emit an infrared ray. The HMD sensor 120 has a position tracking function for detecting the movement of the HMD 110. More specifically, the HMD sensor 120 reads a plurality of infrared rays emitted by the HMD 110 to detect the position and the inclination of the HMD 110 in a real space.

In at least one aspect, the HMD sensor 120 may be achieved by a camera. In this case, the HMD sensor 120 may use image information of the HMD 110 output from the camera to execute image analysis processing, to thereby enable detection of the position and the inclination of the HMD 110.

In at least one aspect, the HMD 110 may include the sensor 114 instead of the HMD sensor 120 as a position detector. The HMD 110 may use the sensor 114 to detect the position and the inclination of the HMD 110 itself. For example, when the sensor 114 is an angular velocity sensor, a geomagnetic sensor, an acceleration sensor, or a gyrosensor, the HMD 110 may use any of those sensors instead of the HMD sensor 120 to detect the position and the inclination of the HMD 110 itself. As an example, when the sensor 114 is an angular velocity sensor, the angular velocity sensor detects over time the angular velocity about each of three axes of the HMD 110 in the real space. The HMD 110 calculates a temporal change of the angle about each of the three axes of the HMD 110 based on each angular velocity, and further calculates an inclination of the HMD 110 based on the temporal change of the angles. Further, the HMD 110 may include a transmissive display device. In this case, the transmissive display device may be configured as a display device that is temporarily non-transmissive by adjusting the transmittance of the display device. The visual-field image may include a section for presenting a real space on a part of the image forming the virtual space. For example, an image photographed by a camera mounted to the HMD 110 may be superimposed and displayed on a part of the visual-field image, or the real space may be visually recognized from a part of the visual-field image by increasing the transmittance of a part of the transmissive display device.

The eye gaze sensor 140 is configured to detect a direction (line of sight) in which the lines of sight of the right eye and the left eye of a user 190 are directed. The direction is detected by, for example, a known eye tracking function. The eye gaze sensor 140 is achieved by a sensor having the eye tracking function. In at least one aspect, the eye gaze sensor 140 includes a right-eye sensor and a left-eye sensor. The eye gaze sensor 140 may be, for example, a sensor configured to irradiate the right eye and the left eye of the user 190 with infrared light, and to receive reflection light from the cornea and the iris with respect to the irradiation light, to thereby detect a rotational angle of each eyeball. The eye gaze sensor 140 can detect the line of sight of the user 190 based on each detected rotational angle.

The server 150 may transmit a program to the computer 200. In at least one aspect, the server 150 may communicate to/from another computer 200 for providing virtual reality to an HMD used by another user. For example, when a plurality of users play a participatory game in an amusement facility, each computer 200 communicates to/from another computer 200 with a signal based on the motion of each user, to thereby enable the plurality of users to enjoy a common game in the same virtual space.

The controller 160 is connected to the computer 200 through wired or wireless communication. The controller 160 receives input of a command from the user 190 to the computer 200. In one aspect, the controller 160 can be held by the user 190. In another aspect, the controller 160 can be mounted to the body or a part of the clothes of the user 190. In at least one aspect, the controller 160 may be configured to output at least any one of a vibration, a sound, or light based on the signal transmitted from the computer 200. In at least one aspect, the controller 160 receives from the user 190 an operation for controlling the position and the movement of an object arranged in the virtual space.

In at least one aspect, the motion sensor 130 is mounted on the hand of the user to detect the movement of the hand of the user. For example, the motion sensor 130 detects a rotational speed and the number of rotations of the hand. The detected signal is transmitted to the computer 200. The motion sensor 130 is provided to, for example, the glove-type controller 160. According to at least one embodiment of this disclosure, for the safety in the real space, the motion sensor 130 is mounted on an object like a glove-type object that does not easily fly away by being worn on a hand of the user 190. In at least one aspect, a sensor that is not mounted on the user 190 may detect the movement of the hand of the user 190. For example, a signal of a camera that photographs the user 190 may be input to the computer 200 as a signal representing the motion of the user 190. As one example, the motion sensor 130 and the computer 200 are connected to each other through wireless communication. In the case of wireless communication, the communication mode is not particularly limited, and for example, Bluetooth® or other known communication methods may be used.

[Hardware Configuration]

Figure 2:
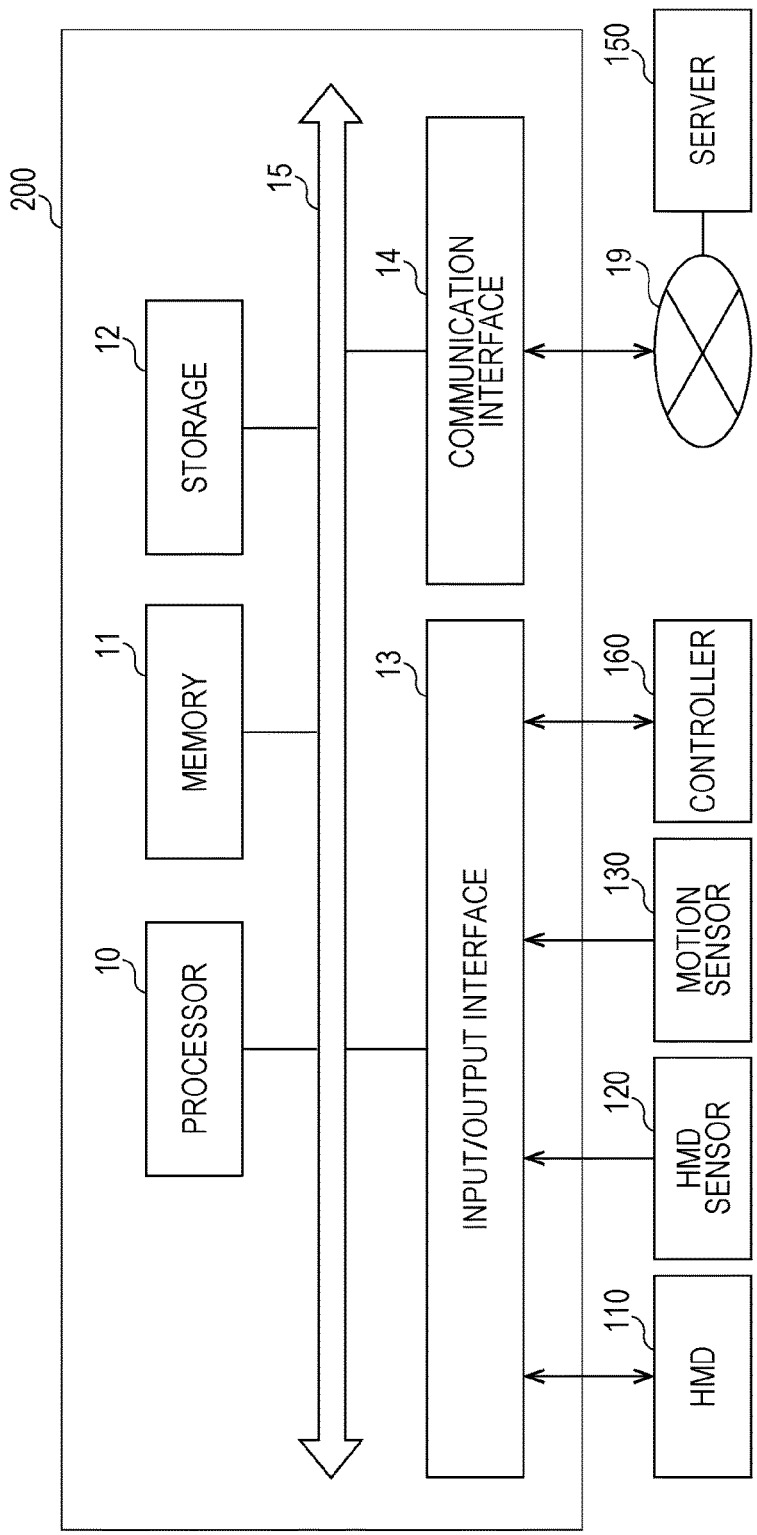
FIG. 2 is a block diagram of an example of a hardware configuration of a computer of at least one embodiment of this disclosure.

With reference to FIG. 2, the computer 200 of at least one embodiment is described. FIG. 2 is a block diagram of an example of the hardware configuration of the computer 200 of at least one embodiment of this disclosure. The computer 200 includes, as primary components, a processor 10, a memory 11, a storage 12, an input/output interface 13, and a communication interface 14. Each component is connected to a bus 15.

The processor 10 is configured to execute a series of commands included in a program stored in the memory 11 or the storage 12 based on a signal transmitted to the computer 200 or on satisfaction of a condition determined in advance. In at least one aspect, the processor 10 is achieved as a central processing unit (CPU), a micro-processor unit (MPU), a field-programmable gate array (FPGA), or other devices.

The memory 11 temporarily stores programs and data. The programs are loaded from, for example, the storage 12. The data includes data input to the computer 200 and data generated by the processor 10. In at least one aspect, the memory 11 is achieved as a random access memory (RAM) or other volatile memories.

The storage 12 permanently stores programs and data. The storage 12 is achieved as, for example, a read-only memory (ROM), a hard disk device, a flash memory, or other non-volatile storage devices. The programs stored in the storage 12 include programs for providing a virtual space in the HMD system 100, simulation programs, game programs, user authentication programs, and programs for achieving communication to/from other computers 200. The data stored in the storage 12 includes data and objects for defining the virtual space.

In at least one aspect, the storage 12 may be achieved as a removable storage device like a memory card. In at least one aspect, a configuration that uses programs and data stored in an external storage device may be used instead of the storage 12 built into the computer 200. With such a configuration, for example, in a situation in which a plurality of HMD systems 100 are used as in an amusement facility, the programs and the data can be collectively updated.

According to at least one embodiment of this disclosure, the input/output interface 13 is configured to allow communication of signals among the HMD 110, the HMD sensor 120, and the motion sensor 130. In at least one aspect, the input/output interface 13 is achieved with use of a universal serial bus (USB), a digital visual interface (DVI), a high-definition multimedia interface (HDMI)®, or other terminals. The input/output interface 13 is not limited to ones described above.

According to at least one embodiment of this disclosure, the input/output interface 13 may further communicate to/from the controller 160. For example, the input/output interface 13 receives input of a signal output from the controller 160 and the motion sensor 130. In at least one aspect, the input/output interface 13 transmits a command output from the processor 10 to the controller 160. The command instructs the controller 160 to vibrate, output a sound, emit light, or the like. When the controller 160 receives the command, the controller 160 executes anyone of vibration, sound output, and light emission in accordance with the command.

The communication interface 14 is connected to the network 19 to communicate to/from other computers (e.g., the server 150) connected to the network 19. In at least one aspect, the communication interface 14 is achieved as, for example, a local area network (LAN), other wired communication interfaces, wireless fidelity (Wi-Fi), Bluetooth®, near field communication (NFC), or other wireless communication interfaces. The communication interface 14 is not limited to ones described above.

In at least one aspect, the processor 10 accesses the storage 12 and loads one or more programs stored in the storage 12 to the memory 11 to execute a series of commands included in the program. The one or more programs may include an operating system of the computer 200, an application program for providing a virtual space, and game software that can be executed in the virtual space. The processor 10 transmits a signal for providing a virtual space to the HMD 110 via the input/output interface 13. The HMD 110 displays a video on the monitor 112 based on the signal.

In the example in FIG. 2, the computer 200 is provided outside of the HMD 110, but in at least one aspect, the computer 200 may be built into the HMD 110. As an example, a portable information communication terminal (e.g., a smart phone) including the monitor 112 may function as the computer 200.

Further, the computer 200 may be used in common among a plurality of HMDs 110. With such a configuration, for example, the same virtual space can be provided to a plurality of users, and hence each user can enjoy the same application with other users in the same virtual space.

According to at least one embodiment of this disclosure, in the HMD system 100, a global coordinate system is set in advance. The global coordinate system has three reference directions (axes) that are respectively parallel to a vertical direction, a horizontal direction orthogonal to the vertical direction, and a front-rear direction orthogonal to both of the vertical direction and the horizontal direction in a real space. In at least one embodiment, the global coordinate system is one type of point-of-view coordinate system. Hence, the horizontal direction, the vertical direction (up-down direction), and the front-rear direction in the global coordinate system are defined as an x axis, a y axis, and a z axis, respectively. More specifically, the x axis of the global coordinate system is parallel to the horizontal direction of the real space, the y axis thereof is parallel to the vertical direction of the real space, and the z axis thereof is parallel to the front-rear direction of the real space.

In at least one aspect, the HMD sensor 120 includes an infrared sensor. When the infrared sensor detects the infrared ray emitted from each light source of the HMD 110, the infrared sensor detects the presence of the HMD 110. The HMD sensor 120 further detects the position and the inclination of the HMD 110 in the real space in accordance with the movement of the user 190 wearing the HMD 110 based on the value of each point (each coordinate value in the global coordinate system). In more detail, the HMD sensor 120 can detect the temporal change of the position and the inclination of the HMD 110 with use of each value detected over time.

The global coordinate system is parallel to a coordinate system of the real space. Therefore, each inclination of the HMD 110 detected by the HMD sensor 120 corresponds to each inclination about each of the three axes of the HMD 110 in the global coordinate system. The HMD sensor 120 sets a uvw visual-field coordinate system to the HMD 110 based on the inclination of the HMD 110 in the global coordinate system. The uvw visual-field coordinate system set to the HMD 110 corresponds to a point-of-view coordinate system used when the user 190 wearing the HMD 110 views an object in the virtual space.

[Uvw Visual-Field Coordinate System]

Figure 3:
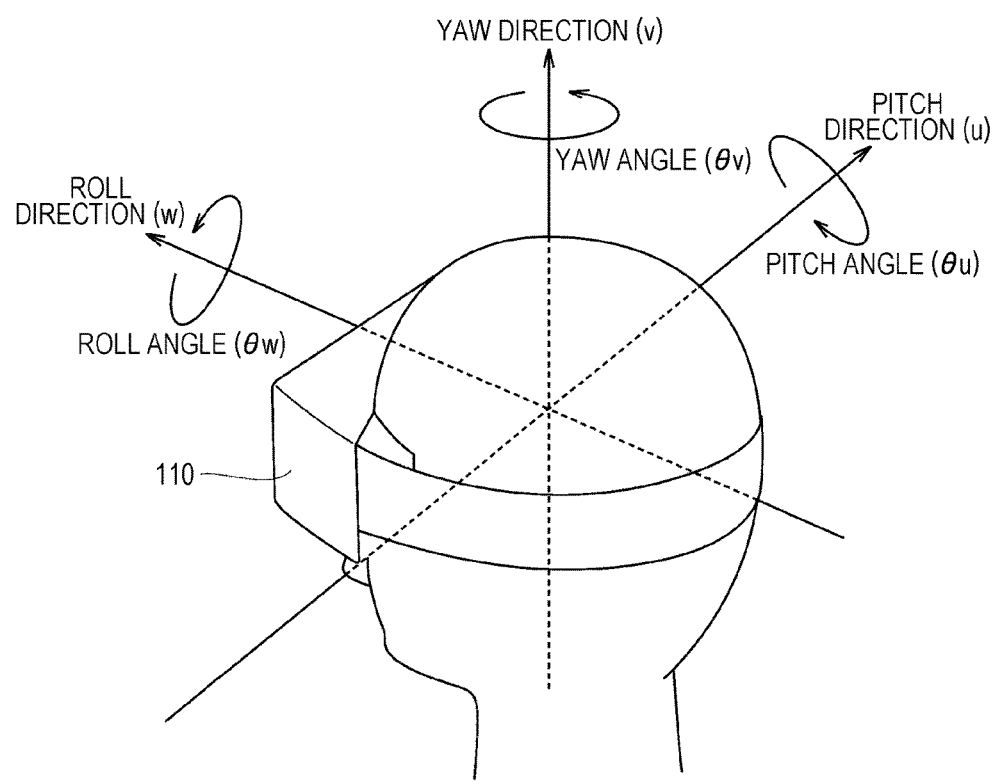
FIG. 3 is a diagram of a uvw visual-field coordinate system to be set for an HMD of at least one embodiment of this disclosure.

With reference to FIG. 3, the uvw visual-field coordinate system is described. FIG. 3 is a diagram of a uvw visual-field coordinate system to be set for the HMD 110 of at least one embodiment of this disclosure. The HMD sensor 120 detects the position and the inclination of the HMD 110 in the global coordinate system when the HMD 110 is activated. The processor 10 sets the uvw visual-field coordinate system to the HMD 110 based on the detected values.

In FIG. 3, the HMD 110 sets the three-dimensional uvw visual-field coordinate system defining the head of the user wearing the HMD 110 as a center (origin). More specifically, the HMD 110 sets three directions newly obtained by inclining the horizontal direction, the vertical direction, and the front-rear direction (x axis, y axis, and z axis), which define the global coordinate system, about the respective axes by the inclinations about the respective axes of the HMD 110 in the global coordinate system as a pitch direction (u axis), a yaw direction (v axis), and a roll direction (w axis) of the uvw visual-field coordinate system in the HMD 110.

In at least one aspect, when the user 190 wearing the HMD 110 is standing upright and is visually recognizing the front side, the processor 10 sets the uvw visual-field coordinate system that is parallel to the global coordinate system to the HMD 110. In this case, the horizontal direction (x axis), the vertical direction (y axis), and the front-rear direction (z axis) of the global coordinate system directly match the pitch direction (u axis), the yaw direction (v axis), and the roll direction (w axis) of the uvw visual-field coordinate system in the HMD 110, respectively.

After the uvw visual-field coordinate system is set to the HMD 110, the HMD sensor 120 can detect the inclination (change amount of the inclination) of the HMD 110 in the uvw visual-field coordinate system that is set based on the movement of the HMD 110. In this case, the HMD sensor 120 detects, as the inclination of the HMD 110, each of a pitch angle ($\theta u$), a yaw angle ($\theta v$), and a roll angle ($\theta w$) of the HMD 110 in the uvw visual-field coordinate system. The pitch angle ($\theta u$) represents an inclination angle of the HMD 110 about the pitch direction in the uvw visual-field coordinate system. The yaw angle ($\theta v$) represents an inclination angle of the HMD 110 about the yaw direction in the uvw visual-field coordinate system. The roll angle ($\theta w$) represents an inclination angle of the HMD 110 about the roll direction in the uvw visual-field coordinate system.

The HMD sensor 120 sets, to the HMD 110, the uvw visual-field coordinate system of the HMD 110 obtained after the movement of the HMD 110 based on the detected inclination angle of the HMD 110. The relationship between the HMD 110 and the uvw visual-field coordinate system of the HMD 110 is always constant regardless of the position and the inclination of the HMD 110. When the position and the inclination of the HMD 110 change, the position and the inclination of the uvw visual-field coordinate system of the HMD 110 in the global coordinate system change in synchronization with the change of the position and the inclination.

In at least one aspect, the HMD sensor 120 may specify the position of the HMD 110 in the real space as a position relative to the HMD sensor 120 based on the light intensity of the infrared ray or a relative positional relationship between a plurality of points (e.g., a distance between the points), which is acquired based on output from the infrared sensor. Further, the processor 10 may determine the origin of the uvw visual-field coordinate system of the HMD 110 in the real space (global coordinate system) based on the specified relative position.

[Virtual Space]

Figure 4:
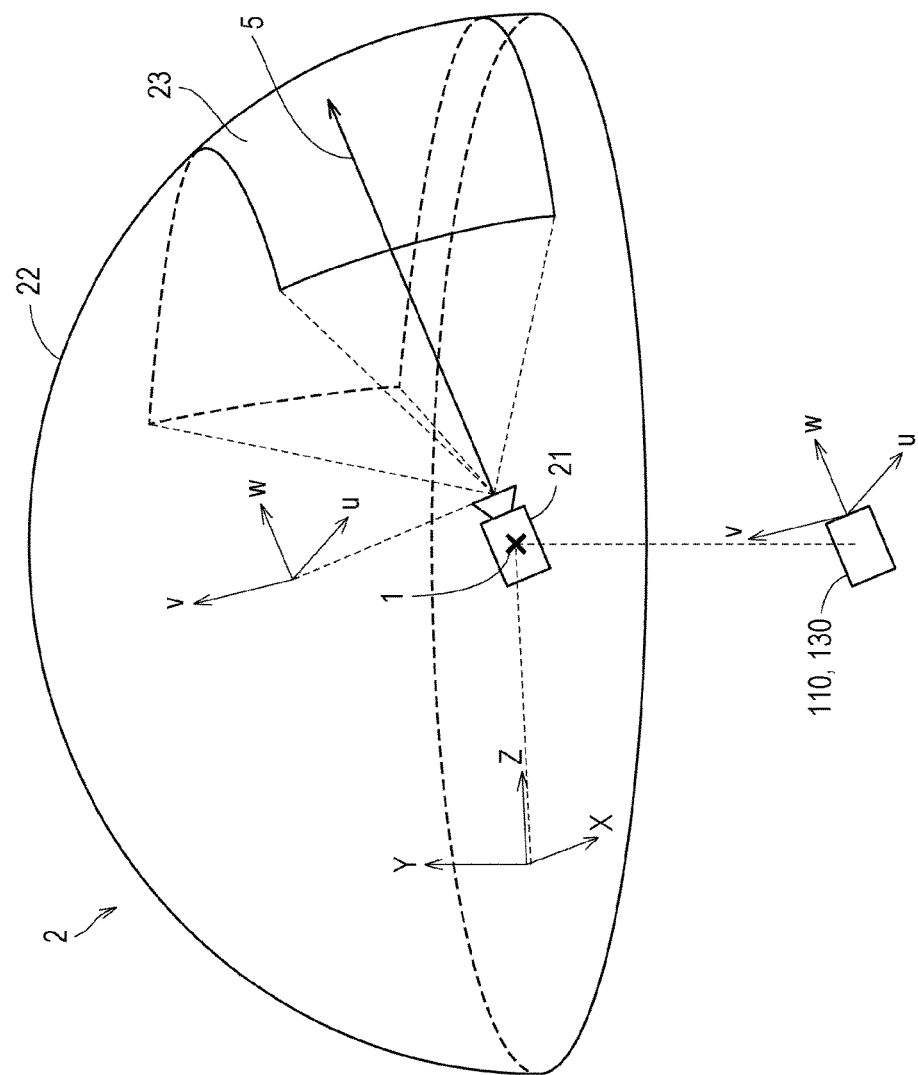
FIG. 4 is a diagram of a mode of expressing a virtual space of at least one embodiment of this disclosure.

With reference to FIG. 4, the virtual space is further described. FIG. 4 is a diagram of a mode of expressing a virtual space 2 of at least one embodiment of this disclosure. The virtual space 2 has a structure with an entire celestial sphere shape covering a center 21 in all 360-degree directions. In FIG. 4, in order to avoid complicated description, only the upper-half celestial sphere of the virtual space 2 is exemplified. Each mesh section is defined in the virtual space 2. The position of each mesh section is defined in advance as coordinate values in an XYZ coordinate system defined in the virtual space 2. The computer 200 associates each partial image forming content (e.g., still image or moving image) that can be developed in the virtual space 2 with each corresponding mesh section in the virtual space 2, to thereby provide to the user the virtual space 2 in which a virtual space image 22 that can be visually recognized by the user is developed.

In at least one aspect, in the virtual space 2, the XYZ coordinate system having the center 21 as the origin is defined. The XYZ coordinate system is, for example, parallel to the global coordinate system. The XYZ coordinate system is one type of the point-of-view coordinate system, and hence the horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the global coordinate system, the Y axis (vertical direction) of the XYZ coordinate system is parallel to the y axis of the global coordinate system, and the Z axis (front-rear direction) of the XYZ coordinate system is parallel to the z axis of the global coordinate system.

When the HMD 110 is activated, that is, when the HMD 110 is in an initial state, a virtual camera 1 is arranged at the center 21 of the virtual space 2. In at least one aspect, the processor 10 displays on the monitor 112 of the HMD 110 an image photographed by the virtual camera 1. In synchronization with the movement of the HMD 110 in the real space, the virtual camera 1 similarly moves in the virtual space 2. With this, the change in position and direction of the HMD 110 in the real space is reproduced similarly in the virtual space 2.

The uvw visual-field coordinate system is defined in the virtual camera 1 similarly to the case of the HMD 110. The uvw visual-field coordinate system of the virtual camera in the virtual space 2 is defined to be synchronized with the uvw visual-field coordinate system of the HMD 110 in the real space (global coordinate system). Therefore, when the inclination of the HMD 110 changes, the inclination of the virtual camera 1 also changes in synchronization therewith. The virtual camera 1 can also move in the virtual space 2 in synchronization with the movement of the user wearing the HMD 110 in the real space.

The processor 10 of the computer 200 defines a visually recognized region 23 in the virtual space 2 based on an arrangement position of the virtual camera 1 and a reference line of sight 5. The visually recognized region 23 corresponds to, of the virtual space 2, the region that is visually recognized by the user wearing the HMD 110.

The line of sight of the user 190 detected by the eye gaze sensor 140 is a direction in the point-of-view coordinate system obtained when the user 190 visually recognizes an object. The uvw visual-field coordinate system of the HMD 110 is equal to the point-of-view coordinate system used when the user 190 visually recognizes the monitor 112. Further, the uvw visual-field coordinate system of the virtual camera 1 is synchronized with the uvw visual-field coordinate system of the HMD 110. Therefore, in the HMD system 100 in at least one aspect, the line of sight of the user 190 detected by the eye gaze sensor 140 can be regarded as the user's line of sight in the uvw visual-field coordinate system of the virtual camera 1.

[User's Line of Sight]

Figure 5:
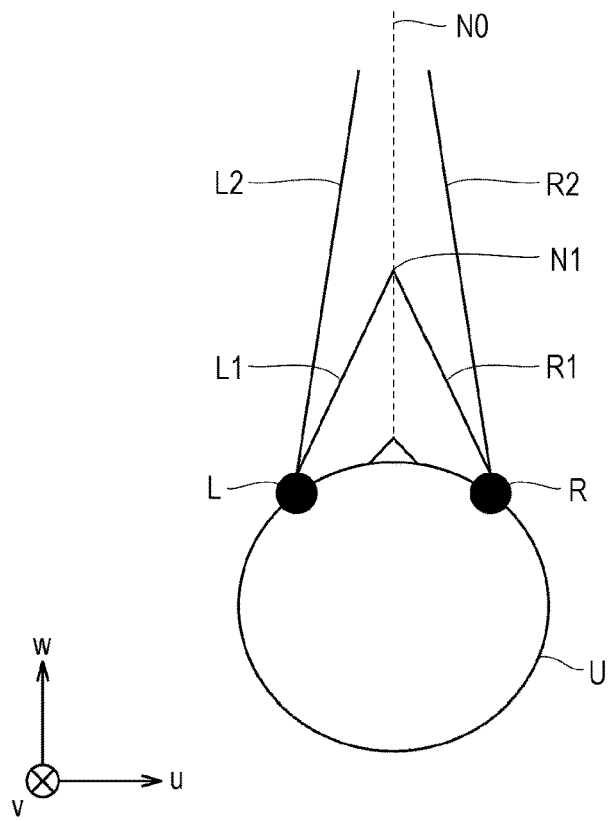
FIG. 5 is a plan view diagram of a head of a user wearing the HMD of at least one embodiment of this disclosure.

With reference to FIG. 5, determination of the user's line of sight is described. FIG. 5 is a plan view diagram of the head of the user 190 wearing the HMD 110 of at least one embodiment of this disclosure.

In at least one aspect, the eye gaze sensor 140 detects lines of sight of the right eye and the left eye of the user 190. In at least one aspect, when the user 190 is looking at a near place, the eye gaze sensor 140 detects lines of sight R1 and L1. In at least one aspect, when the user 190 is looking at a far place, the eye gaze sensor 140 detects lines of sight R2 and L2. In this case, the angles formed by the lines of sight R2 and L2 with respect to the roll direction w are smaller than the angles formed by the lines of sight R1 and L1 with respect to the roll direction w. The eye gaze sensor 140 transmits the detection results to the computer 200.

When the computer 200 receives the detection values of the lines of sight R1 and L1 from the eye gaze sensor 140 as the detection results of the lines of sight, the computer 200 specifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 specifies an intersection of both the lines of sight R2 and L2 as the point of gaze. The computer 200 identifies a line of sight N0 of the user 190 based on the specified point of gaze N1. The computer 200 detects, for example, an extension direction of a straight line that passes through the point of gaze N1 and a midpoint of a straight line connecting a right eye R and a left eye L of the user 190 to each other as the line of sight N0. The line of sight N0 is a direction in which the user 190 actually directs his or her lines of sight with both eyes. Further, the line of sight N0 corresponds to a direction in which the user 190 actually directs his or her lines of sight with respect to the visually recognized region 23.

In at least one aspect, the HMD system 100 may include microphones and speakers in any part constructing the HMD system 100. When the user speaks to the microphone, an instruction can be given to the virtual space 2 with voice.

Further, in at least one aspect, the HMD system 100 may include a television broadcast reception tuner. With such a configuration, the HMD system 100 can display a television program in the virtual space 2.

In at least one aspect, the HMD system 100 may include a communication circuit for connecting to the Internet or have a verbal communication function for connecting to a telephone line.

[Visually Recognized Region]

Figure 6:
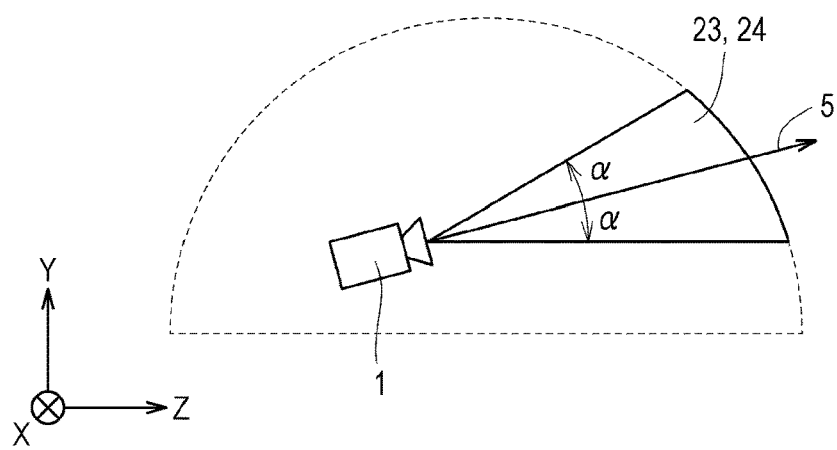
FIG. 6 is a diagram of a YZ cross section obtained by viewing a visually recognized region from an X direction in the virtual space of at least one embodiment of this disclosure.
Figure 7:
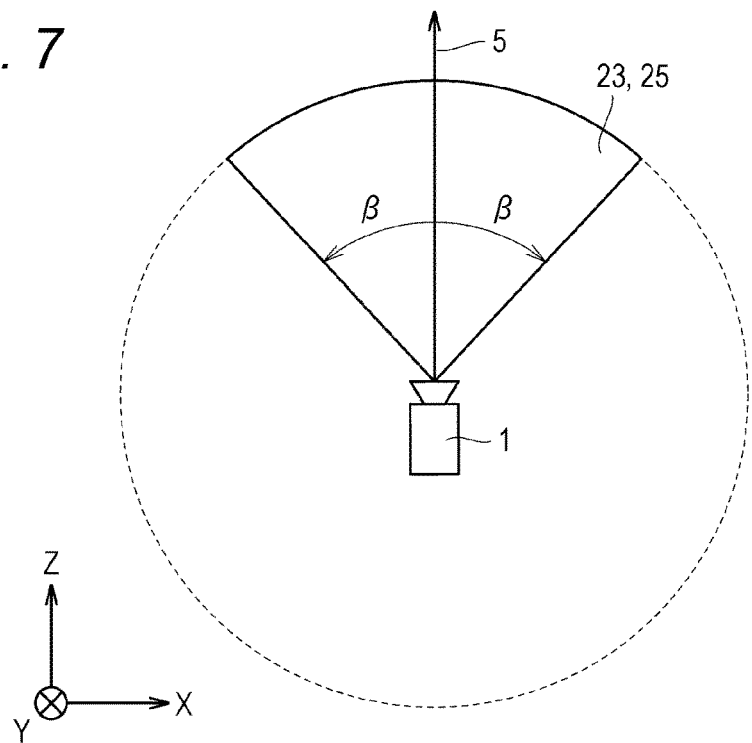
FIG. 7 is a diagram of an XZ cross section obtained by viewing the visually recognized region from a Y direction in the virtual space of at least one embodiment of this disclosure.

With reference to FIG. 6 and FIG. 7, the visually recognized region 23 is described. FIG. 6 is a diagram of a YZ cross section obtained by viewing the visually recognized region 23 from an X direction in the virtual space 2 of at least one embodiment of this disclosure. FIG. 7 is a diagram of an XZ cross section obtained by viewing the visually recognized region 23 from a Y direction in the virtual space 2 of at least one embodiment of this disclosure.

In FIG. 6, the visually recognized region 23 in the YZ cross section includes a region 24. The region 24 is defined by the arrangement position of the virtual camera 1, the reference line of sight 5, and the YZ cross section of the virtual space 2. The processor 10 defines a range of a polar angle α from the reference line of sight 5 serving as the center in the virtual space as the region 24.

In FIG. 7, the visually recognized region 23 in the XZ cross section includes a region 25. The region 25 is defined by the arrangement position of the virtual camera 1, the reference line of sight 5, and the XZ cross section of the virtual space 2. The processor 10 defines a range of an azimuth β from the reference line of sight 5 serving as the center in the virtual space 2 as the region 25. The polar angle α and the azimuth β are determined in accordance with the arrangement position of the virtual camera 1 and the direction of the virtual camera 1.

In at least one aspect, the HMD system 100 causes the monitor 112 to display a field-of-view image 26 based on the signal from the computer 200, to thereby provide the field of view in the virtual space to the user 190. The field-of-view image 26 corresponds to a part of the virtual space image 22, which is superimposed on the visually recognized region 23. When the user 190 moves the HMD 110 worn on his or her head, the virtual camera 1 is also moved in synchronization with the movement. As a result, the position of the visually recognized region 23 in the virtual space 2 is changed. With this, the field-of-view image 26 displayed on the monitor 112 is updated to an image that is superimposed on the visually recognized region 23 of the virtual space image 22 in a direction in which the user faces in the virtual space 2. The user can visually recognize a desired direction in the virtual space 2.

In this way, the direction (inclination) of the virtual camera 1 corresponds to the line of sight of the user (reference line of sight 5) in the virtual space 2, and the position in which the virtual camera 1 is arranged corresponds to the point of view of the user in the virtual space 2. Therefore, through movement (including a motion for changing the arrangement direction and a motion for changing the direction) of the virtual camera 1, the image to be displayed on the monitor 112 is updated, and the field of view (including the point of view and line-of sight) of the user 190 is moved.

While the user 190 is wearing the HMD 110, the user 190 cannot visually recognize the real world but can visually recognize only the virtual space image 22 developed in the virtual space 2. Therefore, the HMD system 100 can provide a high sense of immersion in the virtual space 2 to the user.

In at least one aspect, the processor 10 may move the virtual camera 1 in the virtual space 2 in synchronization with the movement in the real space of the user 190 wearing the HMD 110. In this case, the processor 10 specifies an image region to be projected on the monitor 112 of the HMD 110 (that is, the visually recognized region 23 in the virtual space 2) based on the position and the direction of the virtual camera 1 in the virtual space 2.

According to at least one embodiment of this disclosure, the virtual camera 1 includes two virtual cameras, that is, a virtual camera for providing a right-eye image and a virtual camera for providing a left-eye image. Further, in at least one embodiment, an appropriate parallax is set for the two virtual cameras so that the user 190 can recognize the three-dimensional virtual space 2. In at least one embodiment, the virtual camera 1 includes two virtual cameras, and the roll directions of the two virtual cameras are synthesized so that the generated roll direction (w) is adapted to the roll direction (w) of the HMD 110.

[Controller]

Figure 8:
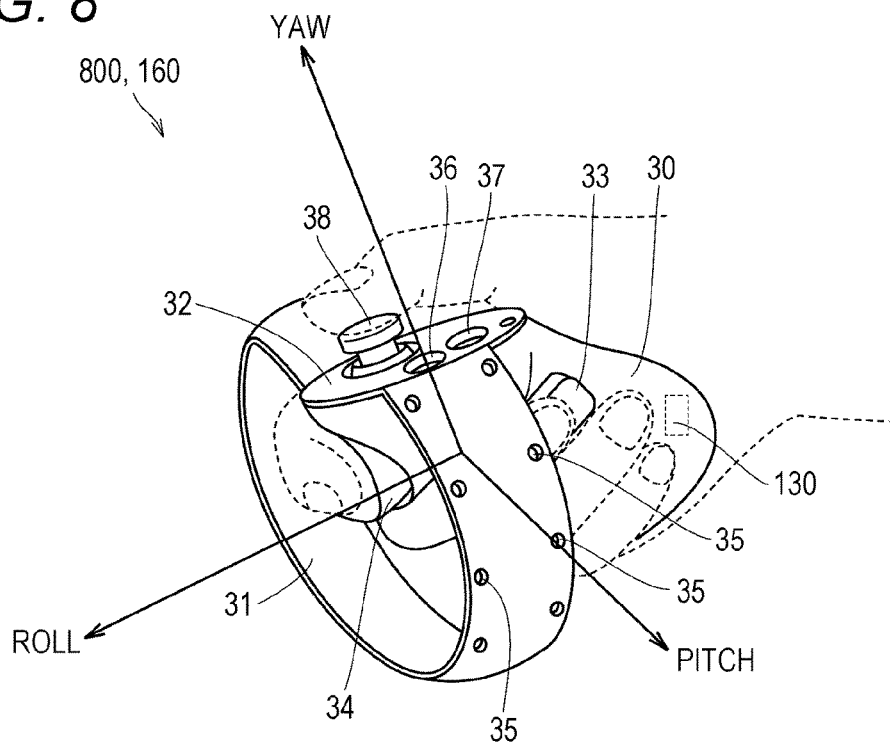
FIG. 8 is a diagram of a controller of at least one embodiment of this disclosure.

An example of the controller 160 is described with reference to FIG. 8. FIG. 8 is a diagram of the controller 160 of at least one embodiment of this disclosure.

In FIG. 8, in one aspect, the controller 160 may include a right controller 800 and a left controller. The right controller 800 is operated by the right hand of the user 190. The left controller is operated by the left hand of the user 190. In at least one aspect, the right controller 800 and the left controller are symmetrically configured as separate devices. Therefore, the user 190 can freely move his or her right hand holding the right controller 800 and his or her left hand holding the left controller. In another aspect, the controller 160 may be an integrated controller configured to receive an operation by both hands. The right controller 800 is now described.

The right controller 800 includes a grip 30, a frame 31, and a top surface 32. The grip 30 is configured so as to be held by the right hand of the user 190. For example, the grip 30 may be held by the palm and three fingers (middle finger, ring finger, and small finger) of the right hand of the user 190.

The grip 30 includes buttons 33 and 34 and the motion sensor 130. The button 33 is arranged on a side surface of the grip 30, and is configured to receive an operation performed by the middle finger of the right hand. The button 34 is arranged on a front surface of the grip 30, and is configured to receive an operation performed by the index finger of the right hand. In at least one aspect, the buttons 33 and 34 are configured as trigger type buttons. The motion sensor 130 is built into the casing of the grip 30. When a motion of the user 190 can be detected from the surroundings of the user 190 by a camera or other device, it is not necessary for the grip 30 to include the motion sensor 130.

The frame 31 includes a plurality of infrared LEDs 35 arranged in a circumferential direction of the frame 31. The infrared LEDs 35 are configured to emit, during execution of a program using the controller 160, infrared rays in accordance with progress of that program. The infrared rays emitted from the infrared LEDs 35 may be used to detect the position and the posture (inclination and direction) of each of the right controller 800 and the left controller (not shown). In FIG. 8, the infrared LEDs 35 are shown as being arranged in two rows, but the number of arrangement rows is not limited to that in FIG. 8. The infrared LEDs 35 may be arranged in one row or in three or more rows.

The top surface 32 includes buttons 36 and 37 and an analog stick 38. The buttons 36 and 37 are configured as push type buttons. The buttons 36 and 37 are configured to receive an operation performed by the thumb of the right hand of the user 190. In at least one aspect, the analog stick 38 is configured to receive an operation in any direction of 360 degrees from an initial position (neutral position). That operation includes, for example, an operation for moving an object arranged in the virtual space 2.

In at least one aspect, the right controller 800 and the left controller include a battery for driving the infrared ray LEDs 35 and other members. The battery may be any of a primary battery and a secondary battery. Any form of the battery may be used. For example, the battery may be a button type or a dry cell type battery. In at least aspect, the right controller 800 and the left controller can be connected to a USB interface of the computer 200. In this case, the right controller 800 and the left controller can be supplied with power via the USB interface.

[Control Device of HMD]

Figure 9:
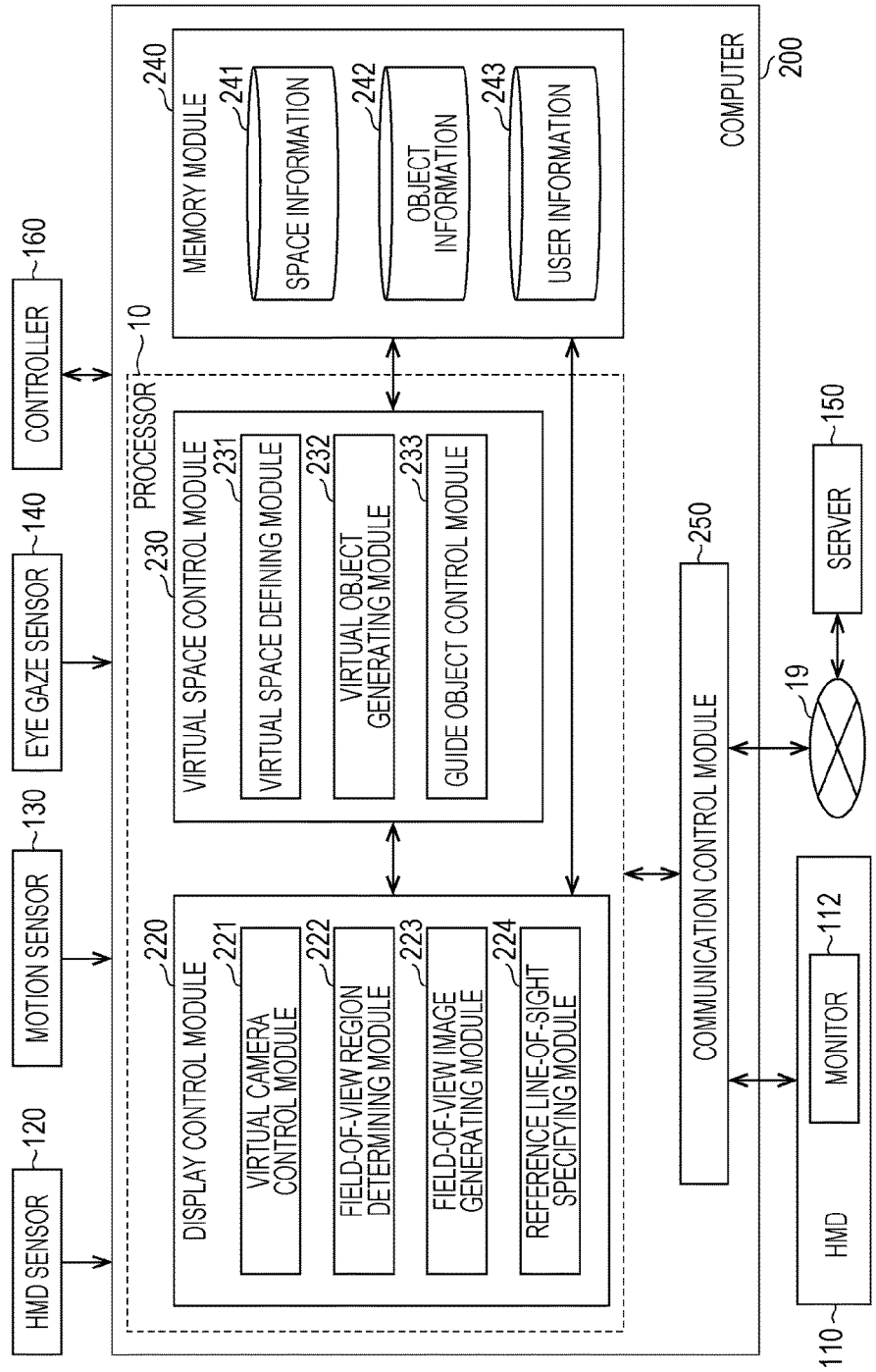
FIG. 9 is a block diagram of a computer of at least one embodiment of this disclosure as a module configuration.

With reference to FIG. 9, the control device of the HMD 110 is described. According to at least one embodiment of this disclosure, the control device is achieved by the computer 200 having a known configuration. FIG. 9 is a block diagram of the computer 200 of at least one embodiment of this disclosure as a module configuration.

In FIG. 9, the computer 200 includes a display control module 220, a virtual space control module 230, a memory module 240, and a communication control module 250. The display control module 220 includes, as sub-modules, a virtual camera control module 221, a field-of-view region determining module 222, a field-of-view image generating module 223, and a reference line-of-sight specifying module 224. The virtual space control module 230 includes, as sub-modules, a virtual space defining module 231, a virtual object generating module 232, and an operation object control module 233.

According to at least one embodiment of this disclosure, the display control module 220 and the virtual space control module 230 are achieved by the processor 10. According to at least one embodiment of this disclosure, a plurality of processors 10 may actuate as the display control module 220 and the virtual space control module 230. The memory module 240 is achieved by the memory 11 or the storage 12. The communication control module 250 is achieved by the communication interface 14.

In at least one aspect, the display control module 220 is configured to control the image display on the monitor 112 of the HMD 110.

The virtual camera control module 221 is configured to arrange the virtual camera 1 in the virtual space 2. The virtual camera control module 221 is also configured to control the arrangement position of the virtual camera 1 and the direction (inclination) of the virtual camera 1 in the virtual space 2. The field-of-view region determining module 222 is configured to define the visually recognized region 23 in accordance with the direction of the head of the user wearing the HMD 110 and the arrangement position of the virtual camera 1. The field-of-view image generating module 223 is configured to generate the field-of-view image 26 to be displayed on the monitor 112 based on the determined visually recognized region 23.

The reference line-of-sight specifying module 224 is configured to specify the line of sight of the user 190 based on the signal from the eye gaze sensor 140.

The virtual space control module 230 is configured to control the virtual space 2 to be provided to the user 190. The virtual space defining module 231 is configured to generate virtual space data representing the virtual space 2 to define the virtual space 2 in the HMD system 100.

The virtual object generating module 232 is configured to generate a target to be arranged in the virtual space 2. Examples of the target may include forests, mountains, other landscapes, and animals to be arranged in accordance with the progression of the story of the game.

The operation object control module 233 is configured to arrange in the virtual space 2 an operation object for receiving an operation by the user in the virtual space 2. The user operates, for example, an object to be arranged in the virtual space 2 by operating the operation object. In at least one aspect, examples of the operation object may include a hand object corresponding to a hand of the user wearing the HMD 110, a leg object corresponding to a leg of the user, a finger object corresponding to a finger of the user, and a stick object corresponding to a stick to be used by the user. When the operation object is a finger object, in particular, the operation object corresponds to a portion of an axis in the direction (axial direction) indicated by that finger.

When any of the objects arranged in the virtual space 2 has collided with another object, the virtual space control module 230 detects that collision. The virtual space control module 230 can detect, for example, the timing of a given object touching another object, and performs processing determined in advance when the timing is detected. The virtual space control module 230 can detect the timing at which objects that are touching separate from each other, and performs processing determined in advance when the timing is detected. The virtual space control module 230 can also detect a state in which objects are touching. Specifically, when the operation object and another object are touching, the operation object control module 233 detects that the operation object and the other object have touched, and performs processing determined in advance.

The memory module 240 stores data to be used for providing the virtual space 2 to the user 190 by the computer 200. In one aspect, the memory module 240 stores space information 241, object information 242, and user information 243.

The space information 241 stores one or more templates defined for providing the virtual space 2.

The object information 242 stores content to be played in the virtual space 2, an object to be used in that content, and information (e.g., position information) for arranging the object in the virtual space 2. Examples of the content may include a game and content representing a landscape similar to that of the real world.

The user information 243 stores a program for causing the computer 200 to function as the control device of the HMD system 100, an application program that uses each piece of content stored in the object information 242, and the like.

The data and programs stored in the memory module 240 are input by the user of the HMD 110. Alternatively, the processor 10 downloads the programs or data from a computer (e.g., the server 150) that is managed by a business operator providing the content, to thereby store the downloaded programs or data in the memory module 240.

The communication control module 250 may communicate to/from the server 150 or other information communication devices via the network 19.

In at least one aspect, the display control module 220 and the virtual space control module 230 may be achieved with use of, for example, Unity® provided by Unity Technologies. In another aspect, the display control module 220 and the virtual space control module 230 may also be achieved by combining the circuit elements for achieving each step of processing.

The processing in the computer 200 is achieved by hardware and software executed by the processor 10. The software may be stored in advance on a hard disk or other memory module 240. The software may also be stored on a compact disc read-only memory (CD-ROM) or other computer-readable non-volatile data recording medium, and distributed as a program product. The software may also be provided as a program product that can be downloaded by an information provider connected to the Internet or other network. Such software is read from the data recording medium by an optical disc drive device or other data reading device, or is downloaded from the server 150 or other computer via the communication control module 250 and then temporarily stored in a storage module. The software is read from the storage module by the processor 10, and is stored in a RAM in a format of an executable program. The processor 10 executes that program.

The hardware constructing the computer 200 in FIG. 9 is known hardware. Therefore, at least one embodiment includes the program stored in the computer 200. The operations of the hardware of the computer 200 are understood by one of ordinary skill in the art, and hence a detailed description thereof is omitted here.

The data recording medium is not limited to a CD-ROM, a flexible disk (FD), and a hard disk. The data recording medium may also be a non-volatile data recording medium configured to store a program in a fixed manner, for example, a magnetic tape, a cassette tape, an optical disc (magnetic optical (MO) disc, mini disc (MD), or digital versatile disc (DVD)), an integrated circuit (IC) card (including a memory card), an optical card, and semiconductor memories such as a mask ROM, an electronically programmable read-only memory (EPROM), an electronically erasable programmable read-only memory (EEPROM), and a flash ROM.

The term "program" referred to herein does not only include a program that can be directly executed by the processor 10. The program may also include a program in a source program format, a compressed program, or an encrypted program, for example.

[Control Structure]

Figure 10:
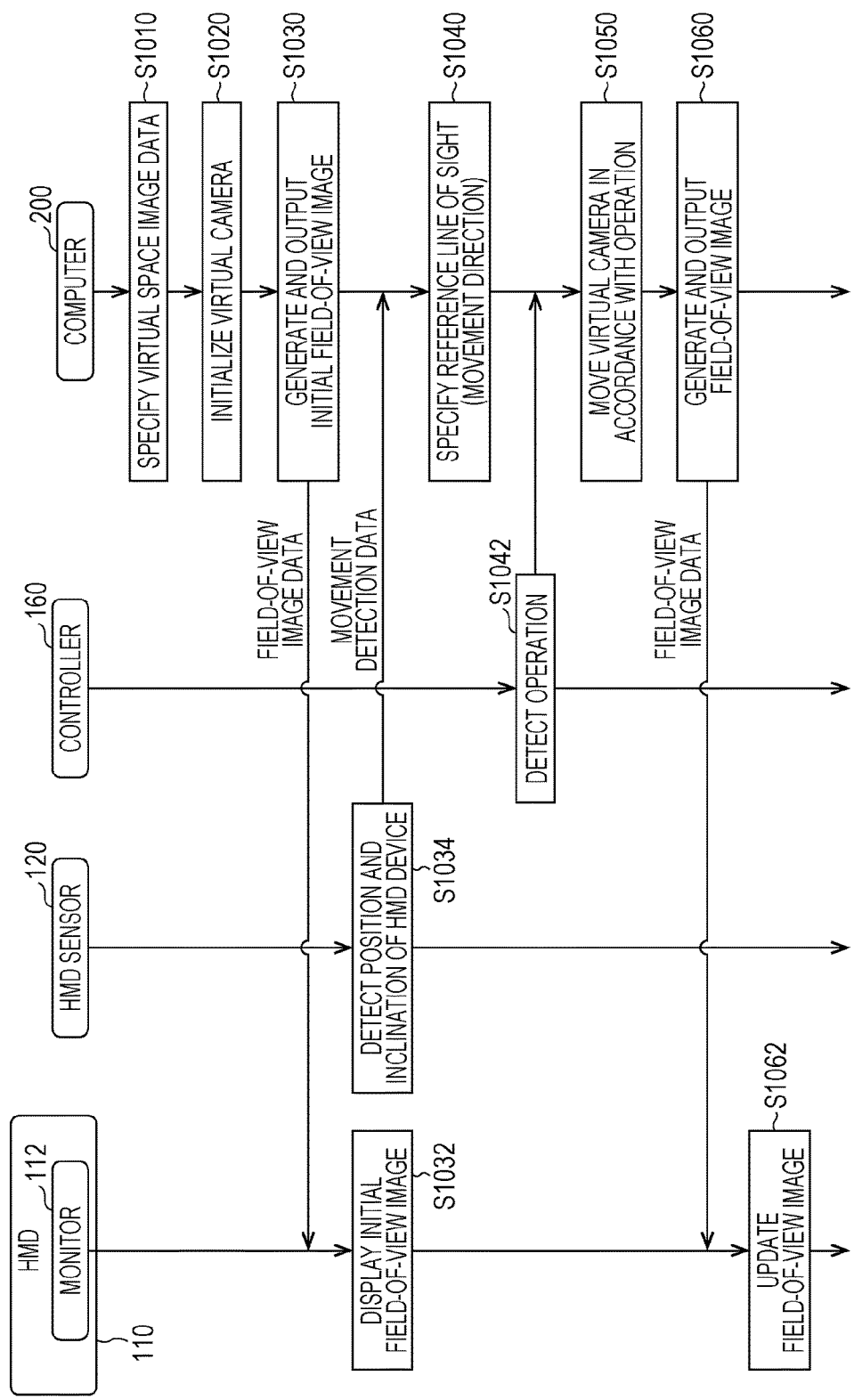
FIG. 10 is a flowchart of processing to be executed by the HMD system of at least one embodiment of this disclosure.

The control structure of the computer 200 of at least one embodiment is now described with reference to FIG. 10. FIG. 10 is a flowchart of processing to be executed by the HMD system 100 of at least one embodiment of this disclosure.

With reference to FIG. 10, in Step S1010, the processor 10 of the computer 200 serves as the virtual space defining module 231 to specify the virtual space image data and define the virtual space 2.

In Step S1020, the processor 10 initializes the virtual camera 1. For example, in a work area of the memory, the processor 10 arranges the virtual camera 1 at the center 21 defined in advance in the virtual space 2, and matches the direction of the virtual camera 1 with the line of sight of the user 190.

In Step S1030, the processor 10 serves as the field-of-view image generating module 223 to generate field-of-view image data for displaying an initial field-of-view image 26. The generated field-of-view image data is transmitted to the HMD 110 by the communication control module 250 via the field-of-view image generating module 223.

In Step S1032, the monitor 112 of the HMD 110 displays the field-of-view image 26 based on the signal received from the computer 200. The user 190 wearing the HMD 110 may recognize the virtual space 2 through visual recognition of the field-of-view image 26.

In Step S1034, the HMD sensor 120 detects the inclination of the HMD 110 based on a plurality of infrared rays emitted from the HMD 110. The detection result is transmitted to the computer 200 as movement detection data.

In Step S1040, the processor 10 specifies the reference line of sight 5 of the virtual camera 1 based on the inclination (movement detection data) of the HMD 110 input from the HMD sensor 120.

In Step S1042, the controller 160 detects an operation by the user 190 in the real space. For example, in at least one aspect, the controller 160 detects the fact that the analog stick has been tilted forward by the user 190. In at least one aspect, the controller 160 detects the fact that a button has been pressed by the user 190. The controller 160 transmits a detection signal representing the details of detection to the computer 200.

In Step S1050, the processor 10 serves as the virtual camera control module 221 to cause the virtual camera 1 to move in the direction of the specified reference line of sight 5 in accordance with the detection signal.

In Step S1060, the processor 10 serves as the field-of-view image generating module 223 to generate field-of-view image data for displaying the field-of-view image 26 photographed by the moved virtual camera 1 to output the generated field-of-view image data to the HMD 110.

In Step S1062, the monitor 112 of the HMD 110 updates the field-of-view image 26 based on the received field-of-view image data, and displays the updated field-of-view image. As a result, the field of view of the user 190 in the virtual space 2 is moved. Next, update of the field-of-view image as a result of the movement of the virtual camera 1 is described with reference to FIG. 11A, FIG. 11B, FIG. 12A, and FIG. 12B.

[Update of Field-of-View Image]

Figure 11A:
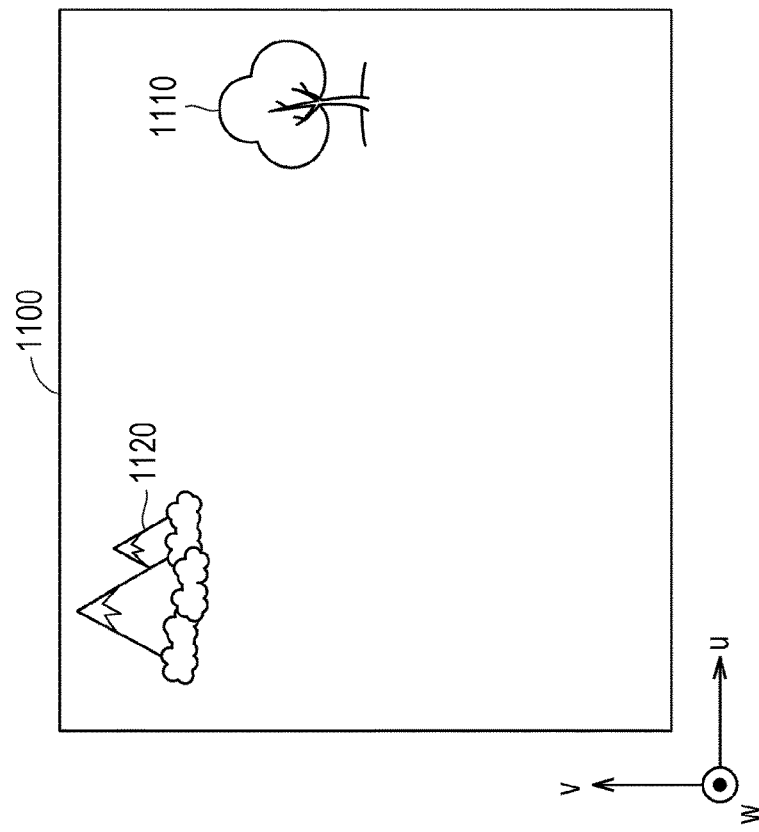
FIG. 11A and FIG. 11B are diagrams of a state before movement of a virtual camera of at least one embodiment of this disclosure.
Figure 11B:
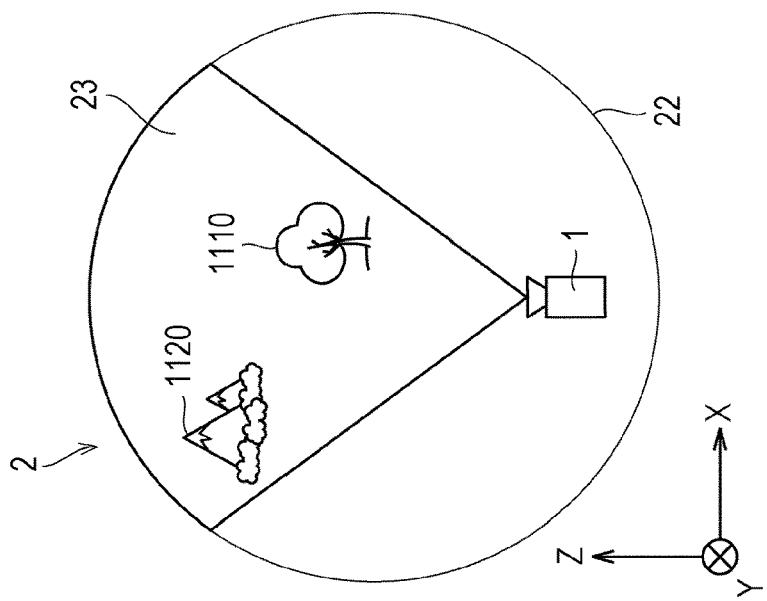

FIG. 11A and FIG. 11B are diagrams of a state before movement of the virtual camera 1 of at least one embodiment of this disclosure. In FIG. 11A, in at least one aspect, the user 190 wearing the HMD 110 visually recognizes a field-of-view image 1100 in the virtual space 2. The field-of-view image 1100 includes a tree object 1110 and a mountain object 1120. At this stage, in FIG. 11B, the virtual camera 1 is photographing the visually recognized region 23 corresponding to the field-of-view image 1100.

In FIG. 11A and FIG. 11B, the user 190 issues a movement command to the controller 160. As an example, the user 190 tilts forward the analog stick included in the controller 160. As a result, the state moves from the state in FIG. 11A and FIG. 11B to the state in FIG. 12A and FIG. 12B.

Figure 12B:
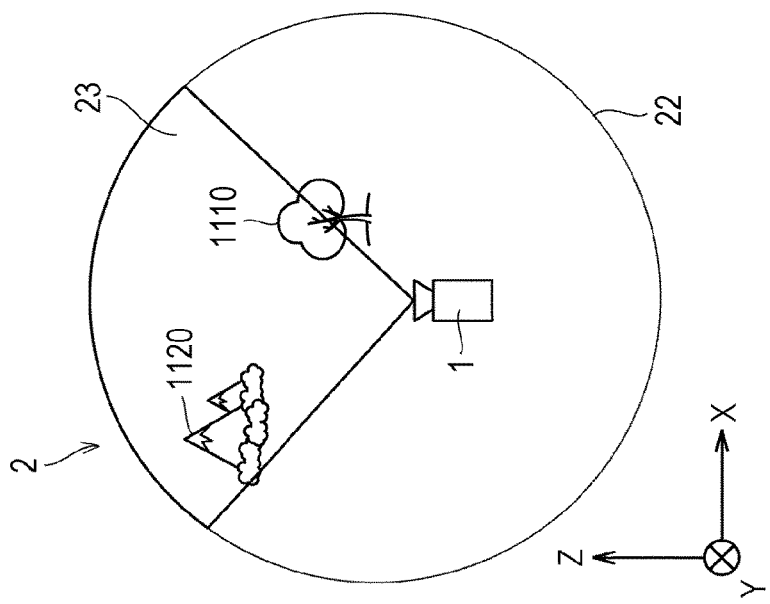
FIG. 12A and FIG. 12B are diagrams of a state after movement of the virtual camera of at least one embodiment of this disclosure.
Figure 12A:
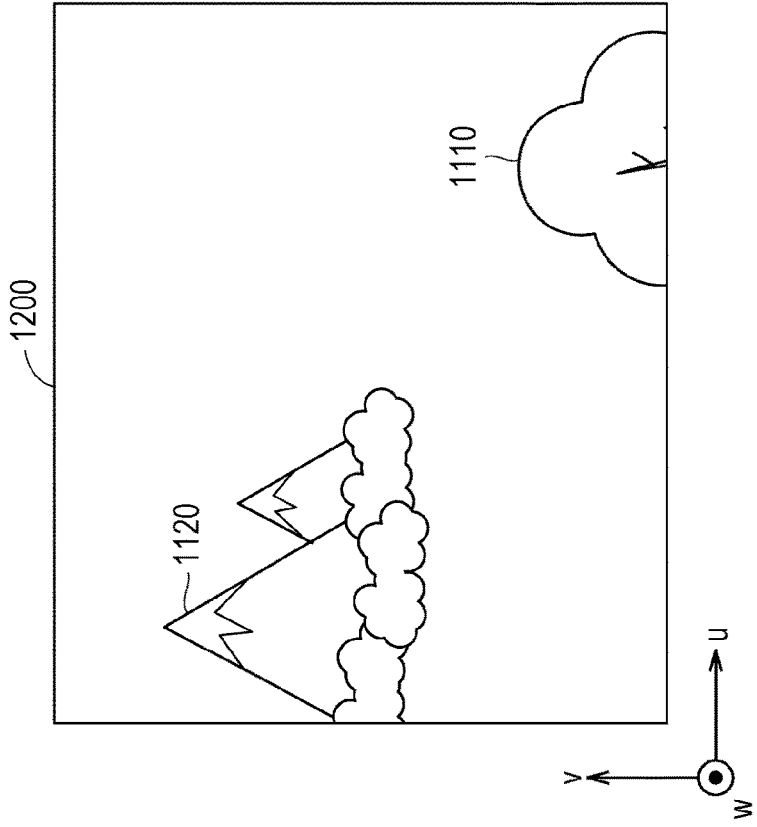

FIG. 12A and FIG. 12B are diagrams of a state after movement of the virtual camera 1 of at least one embodiment of this disclosure. The processor 10 moves the virtual camera 1 in accordance with the detection signal input from the controller 160. More specifically, the processor 10 specifies the reference line of sight 5 of the virtual camera 1 before movement as a movement direction, and moves the virtual camera 1 in the specified movement direction.

In FIG. 12B, the arrangement position of the virtual camera 1 (i.e., point of view of the user 190) has been moved forward compared with the state in FIG. 11B. The user 190 visually recognizes a field-of-view image 1200 photographed by the moved virtual camera 1. Next, movement control of the virtual camera 1 is described with reference to FIG. 13 to FIG. 16.

[Control Structure Relating to Movement of Virtual Camera]

Figure 13:
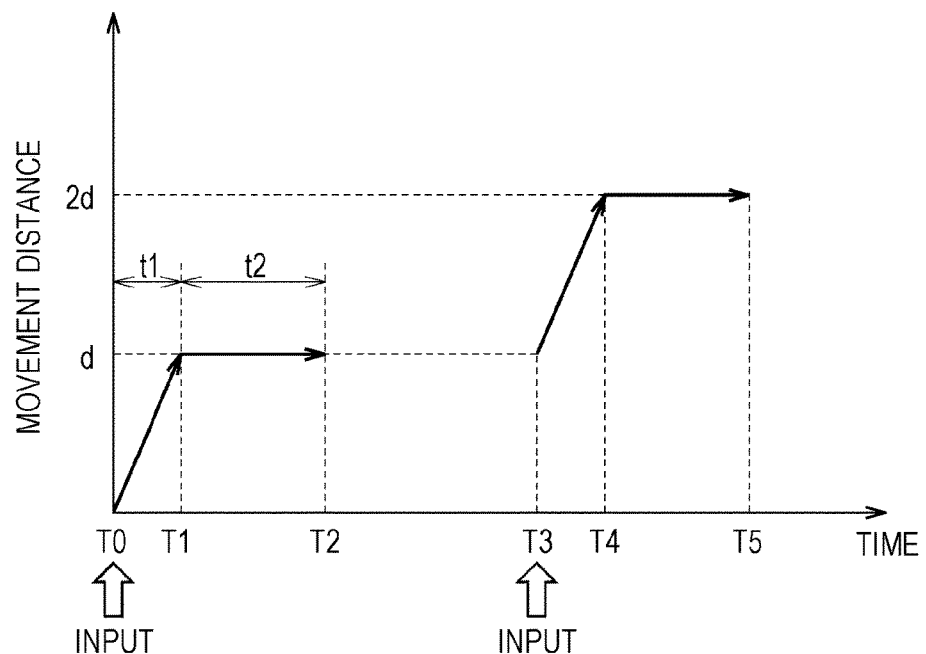
FIG. 13 is a graph of movement control of the virtual camera in response to inputs from the controller of at least one embodiment of this disclosure.

FIG. 13 is a graph of movement control of the virtual camera 1 in response to inputs from the controller 160 in at least one embodiment of this disclosure. The axis of abscissa represents time, and the axis of ordinate represents a movement distance of the virtual camera 1.

As shown in FIG. 13, at a time T0, the processor 10 receives one unit of input from the controller 160 for moving the virtual camera 1. The one unit of input may be a detection signal input from the controller 160 during a period (one frame) in which the monitor 112 updates the image. For example, the processor 10 receives one unit of detection signal from the controller 160 as a result of the user 190 pressing a button on the controller 160 and then immediately returning the button to its original state, or as a result of the user 190 tilting the analog stick of the controller 160 in a desired direction and then immediately returning the analog stick to its original state.

The processor 10 executes a first operation and a second operation in accordance with reception of the one input from the controller 160. According to at least one embodiment of this disclosure, the first operation causes the virtual camera 1 to move rapidly, and the second operation causes the movement of the virtual camera 1 to stop.

In the example shown in FIG. 13, the processor 10 executes the first operation for rapidly moving the virtual camera 1 by a distance d during the period from the time T0 to a time T1 (for t1 seconds). The movement speed of the virtual camera 1 at this time is defined as a first speed (=d/t1). Next, the processor 10 executes the second operation for stopping movement of the virtual camera 1 during the period from the time T1 to a time T2 (for t2 seconds).

The first speed can be set to a speed at which the user feels like he or she is teleporting. This means that the user hardly recognizes the field-of-view image 26 during the period in which he or she is moving at the first speed. As a result, the HMD system 100 can suppress the VR sickness of the user in response to the first operation.

The distance d is set to a distance at which the user does not lose his or her sense of immersion in the virtual space 2. The reason for this is because when the distance d is too long, there is an increased likelihood of the user losing his or her sense of immersion in the virtual space 2, but when the distance d is too short, the virtual camera 1 takes a longer time to arrive at its intended destination.

At a time T3, the processor 10 again receives one input from the controller 160. In accordance with reception of the input, the processor 10 again executes the first operation and the second operation.

As described above, the HMD system 100 of at least one embodiment of this disclosure can, while repeating the operations of rapidly moving the virtual camera 1 and then stopping the virtual camera 1, move the virtual camera 1 to the intended destination of the user 190. This allows the user 190 to feel as if he or she has been intermittently moving while his or her field of view (point of view) is repeatedly teleported. As a result, the HMD system 100 can suppress the VR sickness of the user 190 when moving the virtual camera 1 to the intended destination of the user 190. When the movement of the virtual camera 1 has stopped, the user 190 visually recognizes the movement process until his or her intended destination. As a result, the HMD system 100 can ensure a sense of immersion in the virtual space 2 by the user 190 when the virtual camera 1 is moved to the intended destination of the user 190.

The inventor(s) of this disclosure confirmed, by using a known VR sickness measurement method, that the level of the VR sickness of a user is lower when the virtual camera is moved intermittently than when the virtual camera is moved continuously.

According to at least one embodiment of this disclosure, the duration (t2 seconds) for which the second operation is executed can be set to be longer than the duration (t1 seconds) for which the first operation is executed. The reason for this is because when the duration for which the second operation is executed is too short, the user 190 feels as if his or her field of view (point of view) is continuously moving.

Figure 14:
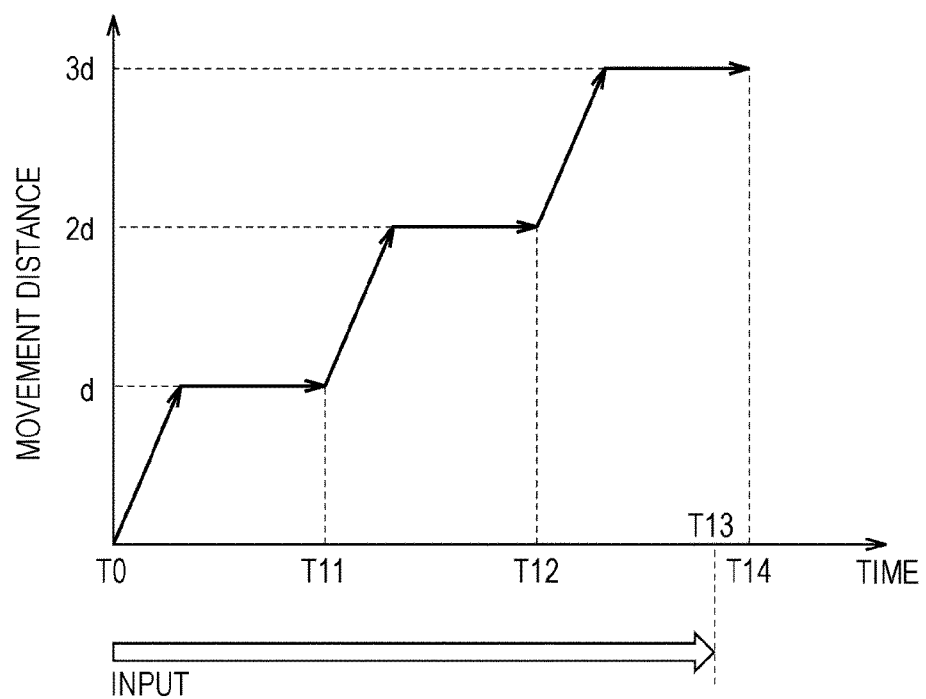
FIG. 14 is a graph of movement control of the virtual camera in response to continuous input from the controller of at least one embodiment of this disclosure.

FIG. 14 is a graph of movement control of the virtual camera 1 in response to continuous input from the controller 160 in at least one embodiment of this disclosure. In FIG. 14, in at least one aspect, the processor 10 continuously receives from the controller 160 input for moving the virtual camera 1 during the period from the time T0 to a time T13. For example, the processor 10 receives continuous input (detection signal) from the controller 160 as a result of the user 190 continuously pressing a button on the controller 160, or as a result of the user 190 continuously tilting the analog stick of the controller 160 in a desired direction.

At the time T0, the processor 10 executes the first operation and the second operation in accordance with reception of the detection signal from the controller 160. The second operation ends at a time T11.

At the time T11, in accordance with the continued reception of the detection signal from the controller 160, the processor 10 again executes the first operation and the second operation. The cycle of moving and stopping the virtual camera 1 is also repeated from a time T12 to a time T14.

At the time T14, a detection signal is not being received from the controller 160, and hence the processor 10 does not move the virtual camera 1. In this way, the processor 10 of one embodiment of this disclosure determines whether or not a detection signal from the controller 160 has been input at an end point of the second operation, and when the detection signal has been input, again executes the first operation and the second operation.

As described above, the processor 10 of at least one embodiment of this disclosure repeats a cycle including the first operation and the second operation during a period in which continuous input for moving the virtual camera 1 is being received from the controller 160. Even based on such movement control of the virtual camera 1, the VR sickness of the user 190 can be suppressed while ensuring a sense of immersion in the virtual space 2 by the user 190.

Figure 15:
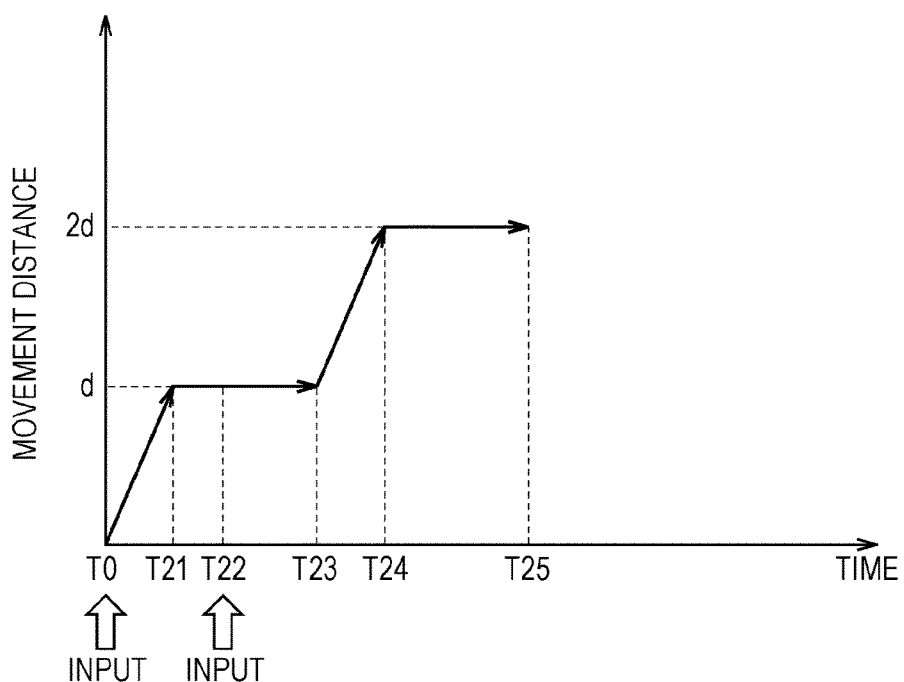
FIG. 15 is a graph of movement control of the virtual camera in response to inputs from the controller of at least one embodiment of this disclosure.

FIG. 15 is a graph of movement control of the virtual camera 1 in response to inputs from the controller 160 in at least one embodiment of this disclosure.

At the time T0, the processor 10 executes the first operation and the second operation in accordance with reception of the detection signal from the controller 160. More specifically, the processor 10 executes the first operation during the period from the time T0 to a time T21, and executes the second operation during the period from the time T21 to a time T23.

At the time T23, the processor 10 determines whether or not the detection signal from the controller 160 has been received during execution of the second operation (from time T21 to time T23). In FIG. 15, the processor 10 determines that the detection signal is received at a time T22, and again executes the first operation and the second operation during the period from the time T23 to a time T25.

At the time T25, the processor 10 determines that the detection signal has not been received during the second iteration of execution of the second operation (time T24 to time T25), and does not move the virtual camera 1.

As described above, the processor 10 of at least one embodiment of this disclosure is configured to again execute a cycle including the first operation and the second operation when the detection signal for moving the virtual camera 1 is received from the controller 160 during execution of the second operation. As a result, for example, when the user 190 repeatedly presses a button on the controller 160, the processor 10 can regularly move the virtual camera 1. Even based on such movement control of the virtual camera 1, the VR sickness of the user 190 can be suppressed while ensuring a sense of immersion in the virtual space 2 by the user 190.

In at least one aspect, the processor 10 may be configured to again execute a cycle including the first operation and the second operation when the detection signal is received during execution of the first operation and the second operation.

Figure 16:
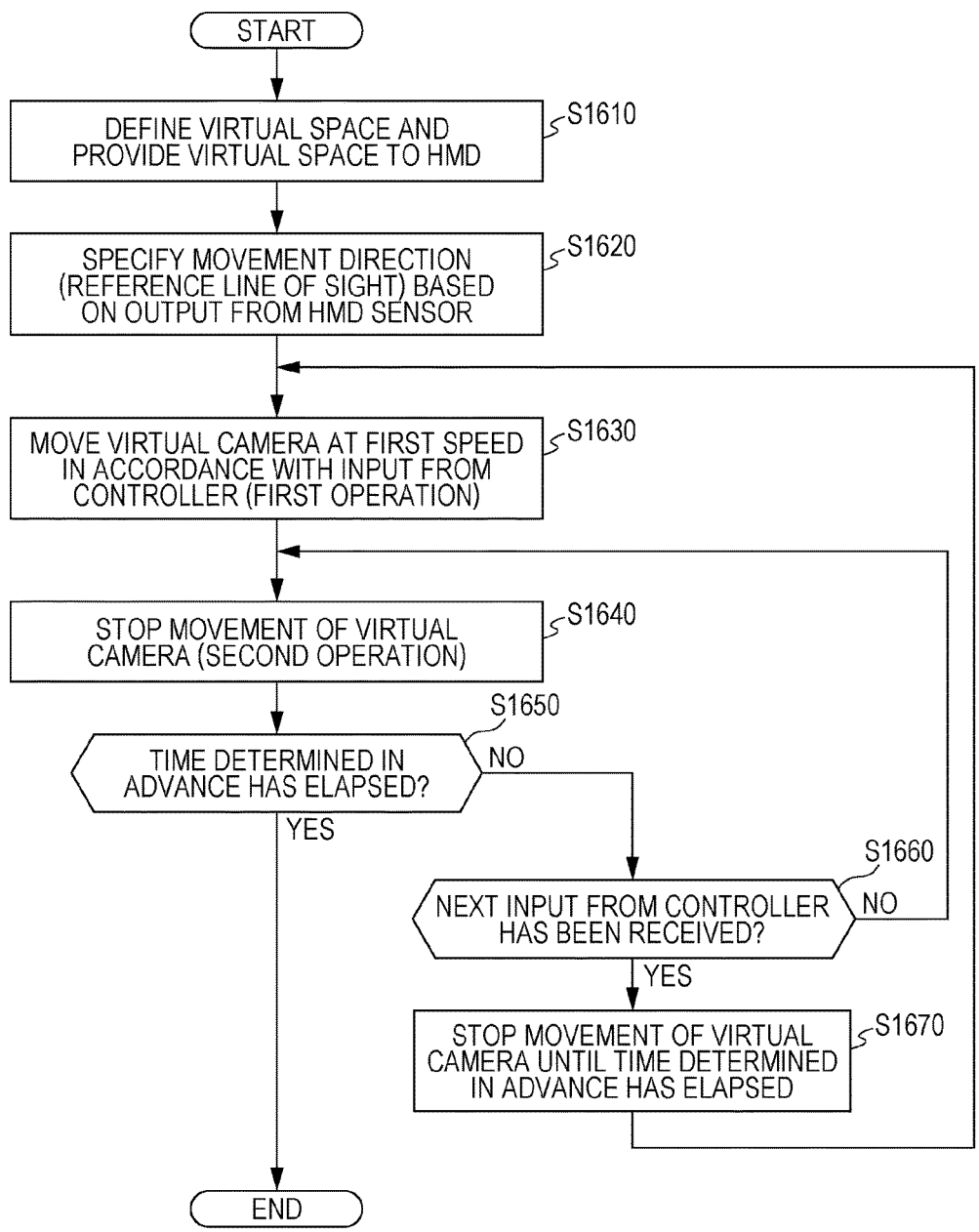
FIG. 16 is a flowchart of movement control of the virtual camera of at least one embodiment of this disclosure.

FIG. 16 is a flowchart of movement control of the virtual camera 1 of at least one embodiment of this disclosure. Each processing step in FIG. 16 can be achieved by the processor 10 of the computer 200 executing a program stored in the memory module 240.

In Step S1610, the processor 10 serves as the virtual space defining module 231 to define the virtual space 2, and to provide the virtual space 2 to the HMD 110 worn by the user 190.

In Step S1620, based on output from the HMD sensor 120, the processor 10 specifies the inclination of the HMD 110, namely, the reference line of sight 5, as a movement direction.

In Step S1630, the processor 10 executes, in accordance with the input from the controller 160 (first input), the first operation for moving the virtual camera 1 at a first speed in the specified movement direction.

In Step S1640, the processor 10 executes the second operation for stopping movement of the virtual camera 1.

In Step S1650, the processor 10 determines whether or not a time (t2 seconds) determined in advance, in which the second operation is to be executed, has elapsed. In response to a determination that the time determined in advance has elapsed (YES in Step S1650), the processor 10 ends the series of processing steps for moving the virtual camera 1. In response to a determination that the time determined in advance has not elapsed (NO in Step S1650), the processor 10 advances the processing to Step S1660.

In Step S1660, the processor 10 determines whether or not a next input (second input) from the controller 160 has been received before the first operation and the second operation in accordance with the first input are complete. In response to a determination that the second input has been received before the first operation and the second operation in accordance with the first input are complete (YES in Step S1660), the processor 10 advances the processing to Step S1670. In response to a determination that the second input has not been received before the first operation and the second operation in accordance with the first input are complete (NO in Step S1660), the processor 10 returns the processing to Step S1640.

In Step S1670, the processor 10 continues the second operation for stopping movement of the virtual camera 1 until a time determined in advance elapses. When the time determined in advance has elapsed, the processor 10 returns the processing to Step S1630.

In this way, the HMD system 100 of at least one embodiment of this disclosure can intermittently move the virtual camera 1 to the intended destination of the user 190 in accordance with output from the controller 160 operated by the user 190. This allows the user 190 to feel as if he or she has been intermittently moving while his or her field of view (point of view) is repeatedly teleported. As a result, the HMD system 100 can suppress the VR sickness of the user 190 when moving the virtual camera 1 to the intended destination of the user 190, and can ensure a sense of immersion in the virtual space 2 by the user 190.

In at least one embodiment described above, the processor 10 specifies the reference line of sight 5 as the movement direction. However, in at least one aspect, the processor 10 may specify the direction in which the analog stick of the controller 160 has been inclined as the movement direction.

Figure 17:
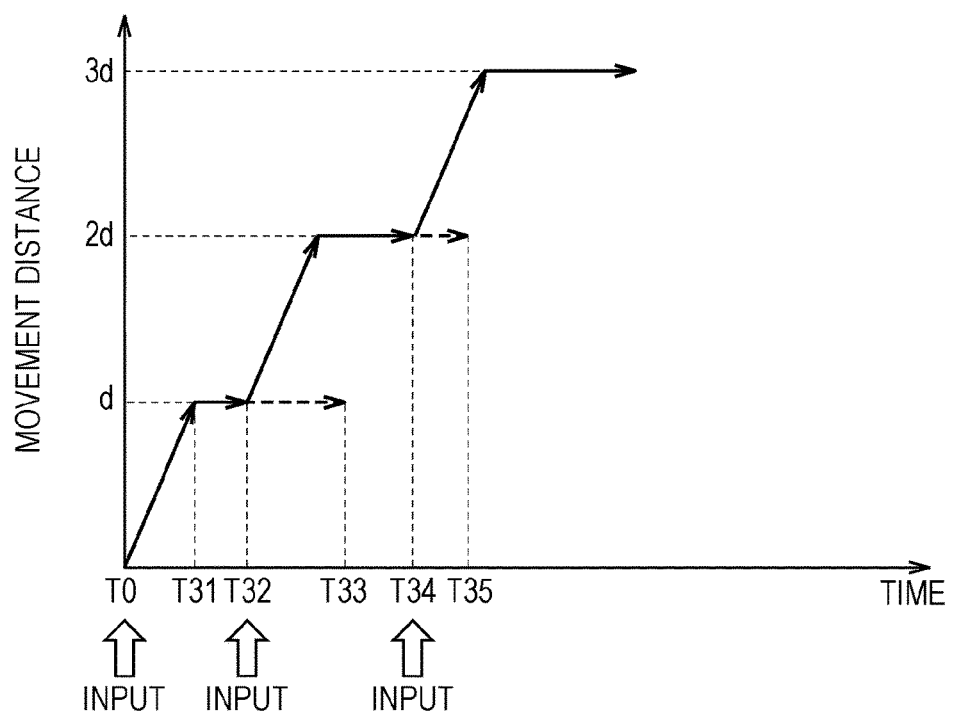
FIG. 17 is a graph of movement control of the virtual camera in response to inputs from the controller of at least one embodiment of this disclosure.

FIG. 17 is a graph of movement control of the virtual camera 1 in response to inputs from the controller 160 in at least one aspect.

At the time T0, in accordance with reception of the detection signal from the controller 160, the processor 10 executes the first operation until a time T31, and then tries to execute the second operation until a time T33. In FIG. 17, the next detection signal from the controller 160 is input to the processor 10 at a time T32, which is during execution of the second operation. In this case, at the time T32, the processor 10 halts the second operation being executed, and executes a second iteration of the first operation and the second operation.

The processor 10 again receives the next detection signal from the controller 160 at a time T34, which is during execution of the second iteration of the second operation. In accordance with reception of that next detection signal, the processor 10 halts the second iteration of the second operation, and executes a third iteration of the first operation and the second operation.

Figure 18:
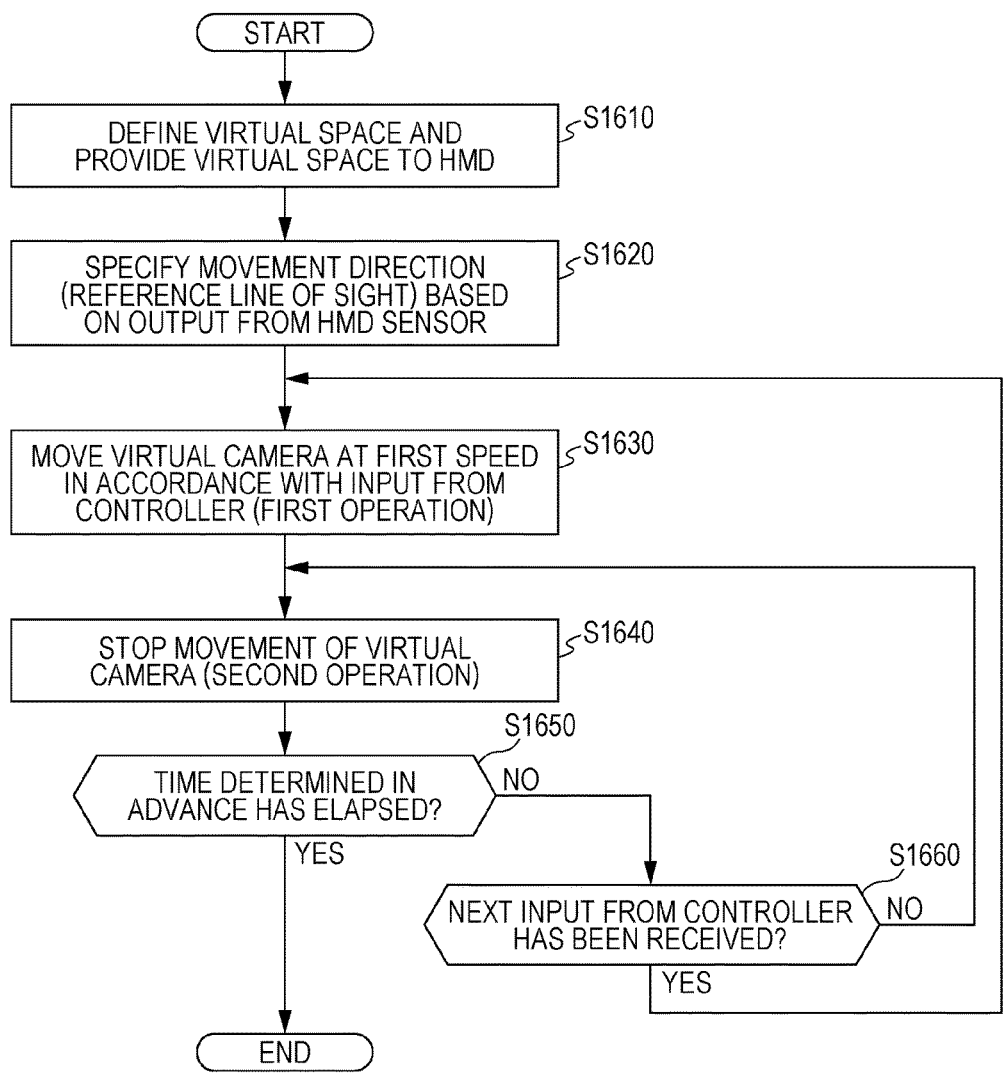
FIG. 18 is a flowchart of control for achieving the processing in FIG. 17 of at least one embodiment of this disclosure.

FIG. 18 is a flowchart of control for achieving the processing shown in FIG. 17 of at least one embodiment of this disclosure. The processing in FIG. 18 is, except for the deletion of the processing of Step S1670, the same as the processing in FIG. 16, and hence a detailed description of the processing that is the same is not repeated here.

In Step S1660, the processor 10 determines whether or not a next input (second input) from the controller 160 has been received before the first operation and the second operation in accordance with the first input are complete. In response to a determination that the second input has been received before the first operation and the second operation in accordance with the first input are complete (YES in Step S1660), the processor 10 halts the first operation and the second operation in accordance with the first input, and returns the processing to Step S1630.

As described above, for example, when the user 190 has repeatedly pressed a button on the controller 160, the processor 10 can move the virtual camera 1 more rapidly than the processing in FIG. 15 and FIG. 16.

According to at least one embodiment of this disclosure, the processor 10 can determine whether or not input from the controller 160 is continuous input. For example, when input from the controller 160 continues for a time determined in advance (e.g., time corresponding to three frames of the monitor 112), the processor 10 can determine that the input is continuous input.

In response to a determination that the input from the controller 160 is continuous input, the processor 10 can execute the processing described with reference to FIG. 16, and in response to a determination that the input from the controller 160 is not continuous input, the processor 10 can execute the processing described with reference to FIG. 18. As a result, the processor 10 can, for example, regularly move the virtual camera 1 when the user 190 continuously presses a button on the controller 160, and move the virtual camera 1 more rapidly when the user 190 repeatedly presses a button on the controller 160.

According to at least one embodiment of this disclosure, the processor 10 is configured to cause, by rapidly moving the virtual camera 1 in the first operation, the user 190 to feel as if his or her field of view (point of view) has been teleported. In at least one aspect, instead of actually rapidly moving the virtual camera 1, the processor 10 can teleport the virtual camera 1.

Figure 19:
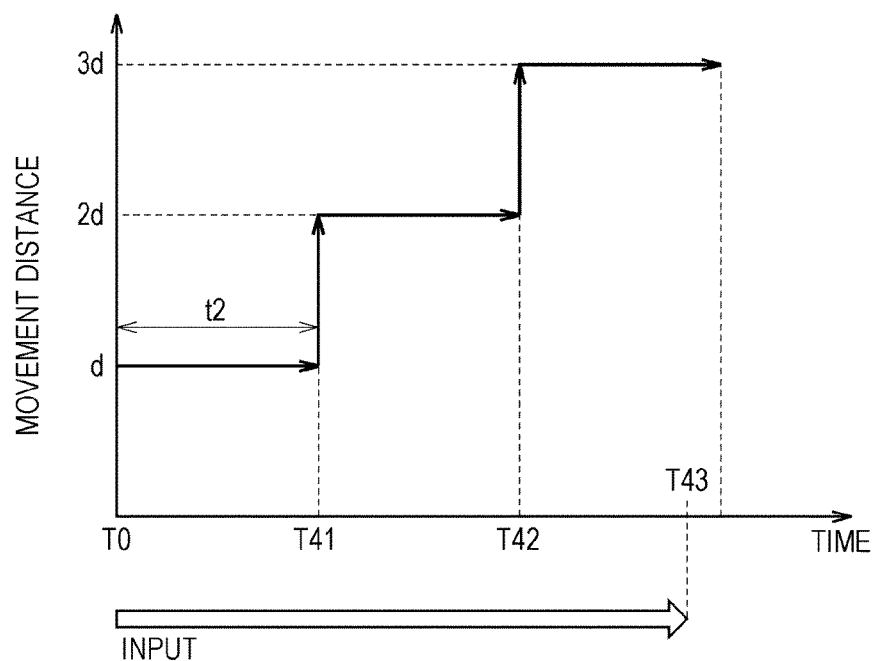
FIG. 19 is a graph of movement control of the virtual camera of at least one embodiment of this disclosure.

FIG. 19 is a graph of movement control of the virtual camera 1 in at least one aspect. In FIG. 19, the processor 10 receives input from the controller 160 during the period from the time T0 to a time T43.

At the time T0, in accordance with reception of the detection signal from the controller 160, the processor 10 executes a first operation for teleporting the virtual camera 1 by changing the arrangement position of the virtual camera 1 to a position further away by a distance d. As a result, at the frame including the time T0, the field of view (point of view) of the user 190 is changed to a position further away by the distance d. The processor 10 executes the first operation, and then executes a second operation for stopping movement of the virtual camera 1 until the time t41 (t2 seconds).

At the time T41, in accordance with the continued reception of the detection signal from the controller 160, the processor 10 again executes the first operation and the second operation. Even at a time T42, in accordance with the continued reception of the detection signal from the controller 160, the processor 10 again executes the first operation and the second operation.

The HMD system 100 of at least one embodiment of this disclosure can further suppress the VR sickness of the user 190 by not allowing the user 190 to recognize the movement process of the field of view (point of view).

In the at least one embodiment described above, the processor 10 is configured to execute, in accordance with input from the controller 160, the first operation for rapidly moving the virtual camera 1 and the second operation for stopping movement of the virtual camera 1. In at least one aspect, instead of stopping the virtual camera 1 in the second operation, the processor 10 may slowly move the virtual camera 1 in the second operation.

Figure 20:
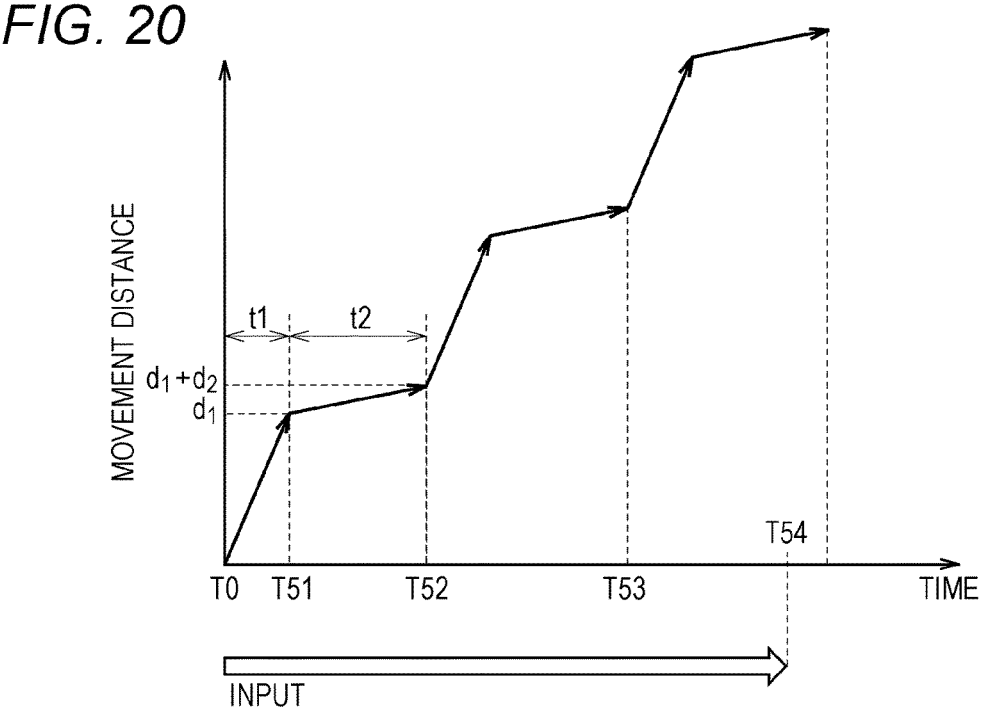
FIG. 20 is a graph of movement control of the virtual camera of at least one embodiment of this disclosure.

FIG. 20 is a graph of movement control of the virtual camera in at least one aspect. In FIG. 20, the processor 10 receives input from the controller 160 during the period from the time T0 to a time T54.

At the time T0, the processor 10 executes, in accordance with reception of the detection signal from the controller 160, the first operation for rapidly moving the virtual camera 1 by a distance d1 during the period from the time T0 to a time T51 (t1 seconds). Then, the processor 10 executes the second operation for slowly moving the virtual camera 1 by a distance d2 during the period from the time T51 to a time T52 (t2 seconds).

In at least one embodiment, the movement speed of the virtual camera 1 in accordance with the first operation (first speed) is set to be faster than the movement speed of the virtual camera 1 in accordance with the second operation (second speed). As a result, the user 190 feels that his or her field of view (point of view) is intermittently moving, and is less susceptible to VR sickness.

In the at least one embodiment described above, the processor 10 is configured to execute, in accordance with input from the controller 160, the second operation for stopping movement of the virtual camera 1 or for slowly moving the virtual camera 1 after executing the first operation for rapidly moving the virtual camera 1. In at least one aspect, the processor 10 may be configured to execute, in accordance with input from the controller 160, the first operation after executing the second operation.

In the at least one embodiment described above, the processor 10 is configured to move the virtual camera 1 at two different movement speeds (including zero) in accordance with input from the controller 160. In at least one aspect, the processor 10 may be configured to move the virtual camera 1 at three or more different movement speeds in accordance with input from the controller 160.

Figure 21:
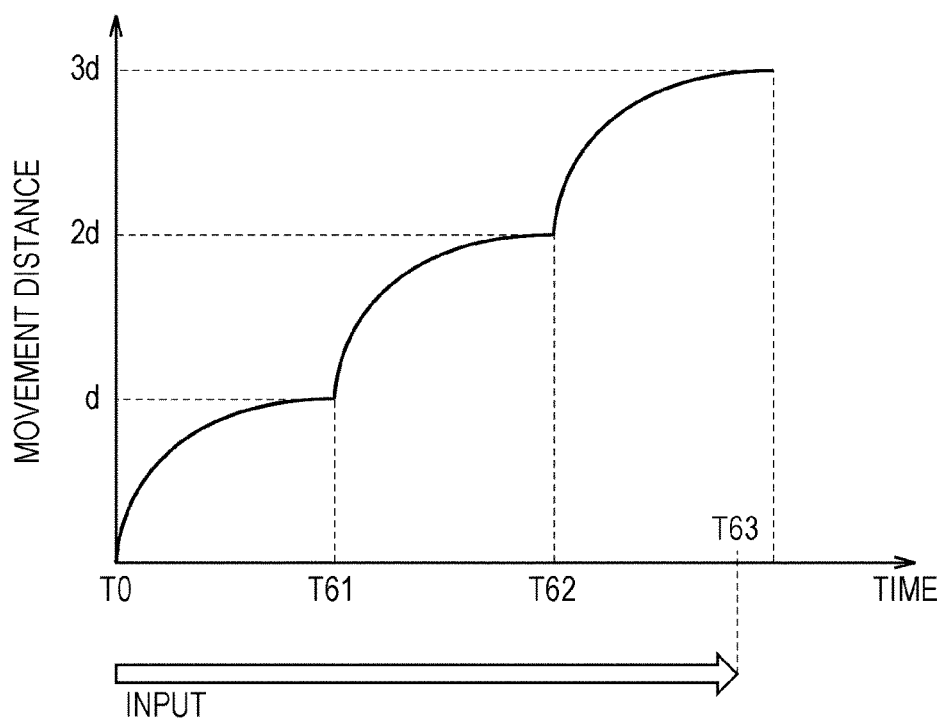
FIG. 21 is a graph of movement control of the virtual camera of at least one embodiment of this disclosure.

FIG. 21 is a graph of movement control of the virtual camera in at least one aspect. In FIG. 21, the processor 10 receives input from the controller 160 during the period from the time T0 to a time T63.

At the time T0, the processor 10 moves, in accordance with reception of the detection signal from the controller 160, the virtual camera 1 by a distance d during the period from the time T0 to a time T61. In this case, the processor 10 moves the virtual camera 1 while continuously changing the movement speed of the virtual camera 1 from high speed to low speed.

At a time T61 and a time T62, the processor 10 repeats, in accordance with the continued reception of the detection signal from the controller 160, processing for moving the virtual camera 1 while continuously changing the movement speed of the virtual camera 1.

Even based on such movement control of the virtual camera 1, the VR sickness of the user 190 can be suppressed while ensuring a sense of immersion in the virtual space 2 by the user 190.

In the at least one embodiment described above, the processor 10 is configured to suppress the VR sickness of the user 190 when moving the arrangement position of the virtual camera 1, or in other words, when moving the point of view of the user 190. In at least one aspect, the processor 10 may suppress the VR sickness of the user 190 by executing the processing described above when changing the direction of the virtual camera 1.

A specific example of control for changing the direction of the virtual camera 1 is now described. The processor 10 detects that the HMD 110 has been inclined based on output from the HMD sensor 120. Then, in accordance with that detection, the processor 10 changes the direction of the virtual camera 1 to an intended angle by repeating a first operation for changing the direction of the virtual camera 1 by a first angular velocity, and a second operation for stopping the change in the direction of the virtual camera 1.

With this configuration, the HMD system 100 of one embodiment of this disclosure intermittently moves the direction of the virtual camera 1, namely, the line of sight of the user 190. As a result, when the line of sight of the user 190 in the virtual space 2 is moved, the HMD system 100 can suppress the VR sickness of the user 190 when moving the virtual camera 1 to the intended destination of the user 190, and can ensure a sense of immersion in the virtual space 2 by the user 190.

In the at least one embodiment described above, the processor 10 is configured to move the virtual camera 1 in accordance with input from the controller 160. In at least one aspect, the processor 10 may be configured to move the virtual camera 1 based on position information on the HMD 110 output from the HMD sensor 120.

In at least one aspect, the processor 10 may be configured to move the virtual camera 1 based on a motion of the user 190 in the real space. As an example, the processor 10 is configured to analyze image data photographed by a camera, and to move the virtual camera 1 during a period in which the user 190 is performing a motion determined in advance (e.g., motion of moving both hands back and forth).

[Configurations]

The technical features of at least one embodiment can be summarized as follows.

(Configuration 1)

There is provided a method to be executed by a processor 10 to provide a virtual space to an HMD 110. The method includes defining a virtual space 2 (Step S1610). The method further includes providing to a user of the HMD 110 a field of view in the virtual space 2 by displaying a field-of-view image 26 on a monitor 112 of the HMD 110 (Step S1610). The method further includes moving a field of view (including a line of sight and a point of view) of the user by updating the image to be displayed on the HMD 110. The moving of the field of view includes moving the field of view at a first speed (Step S1630). The moving of the field of view further includes moving the field of view at a second speed slower than the first speed (Step S1640).

(Configuration 2)

In Configuration 1, the second speed includes zero. In other words, the moving of the field of view at the second speed includes stopping movement of the field of view (Step S1640).

(Configuration 3)

In Configuration 1 or Configuration 2, the moving of the field of view at the second speed is executed after the moving of the field of view at the first speed.

(Configuration 4)

In Configuration 1 to Configuration 3, the moving of the field of view at the first speed and the moving of the field of view at the second speed are executed based on input from a controller 160 configured to receive an operation by the user.

(Configuration 5)

In Configuration 4, the moving of the field of view at the first speed and the moving of the field of view at the second speed are executed in response to one input from the controller 160 (e.g., signal output from the controller 160 during one frame of the monitor 112).

(Configuration 6)

In Configuration 4, the processor 10 is configured to repeat the moving of the field of view at the first speed and the moving of the field of view at the second speed during a period in which input for moving the field of view continues to be received from the controller 160.

(Configuration 7)

In Configuration 4 or Configuration 5, the moving of the field of view includes further executing, when a second input by the controller 160 is issued before the moving of the field of view at the first speed and the moving of the field of view at the second speed, which correspond to a first input by the controller 160, are complete, the moving of the field of view at the first speed and the moving of the field of view at the second speed corresponding to the second input after the moving of the field of view at the first speed and the moving of the field of view at the second speed corresponding to the first input are complete (Step S1670).

(Configuration 8)

In Configuration 4 or Configuration 5, the moving of the field of view includes halting, when a second input by the controller 160 is issued before the moving of the field of view at the first speed and the moving of the field of view at the second speed, which correspond to a first input by the controller 160, are complete, the moving of the field of view at the first speed and the moving of the field of view at the second speed corresponding to the first input (YES in Step S1660 of FIG. 18), and then executing the moving of the field of view at the first speed and the moving of the field of view at the second speed corresponding to the second input.

(Configuration 9)

In Configuration 1 to Configuration 3, the processor 10 is configured to further execute detecting a motion of the HMD 110. The moving of the field of view at the first speed and the moving of the field of view at the second speed are executed based on the detected motion of the HMD 110.

(Configuration 10)

In Configuration 1 to Configuration 3, the processor 10 is configured to further execute detecting a motion of the user. The moving of the field of view at the first speed and the moving of the field of view at the second speed are executed based on the detected motion.

(Configuration 11)

In Configuration 1 to Configuration 10, the processor 10 is configured to further execute arranging in the virtual space 2 a virtual camera 1 configured to photograph a visual-field image 26 to be visually recognized by the user. The moving of the field of view at the first speed includes moving the virtual camera 1 at the first speed. The moving of the field of view at the second speed includes moving the virtual camera 1 at the second speed.

It is to be understood that the embodiments disclosed above are merely examples in all aspects and in no way intended to limit this disclosure. The scope of this disclosure is defined by the appended claims and not by the above description, and it is intended that all modifications made within the scope and spirit equivalent to those of the appended claims are duly included in this disclosure.

What is claimed is:

1. A method comprising:
   defining a virtual space including a point-of-view;
   displaying on a head-mounted device a field of view of the virtual space based on a location of the point-of-view in the virtual space; and
   detecting a unit of an input from a user;
   moving the point-of-view at a first speed in response to the detected unit of the input;
   updating the image displayed on the head-mounted device in accordance with the first speed;
   moving the point-of-view at a second speed slower than the first speed in response to the detected unit of the input;
   updating the image displayed on the head-mounted device in accordance with the second speed.

2. The method according to claim 1, wherein the moving of the point-of-view at the second speed comprises maintaining a location of the field of view.

3. The method according to claim 1, wherein the moving of the point-of-view at the second speed is executed after the moving of the field of view at the first speed.

4. The method according to claim 1, wherein the unit of the input is based on a time duration for which the input is detected.

5. The method according to claim 4, wherein the detecting of the unit of the input comprises detecting a single unit of input in response to detection of the input followed by immediate termination of the detection of the input.

6. The method according to claim 1, wherein the moving of the point-of-view at the first speed and the moving of the point-of-view at the second speed are repeatedly executed during a period in which the input from the user is received.

7. The method according to claim 1, wherein the moving of the point-of-view further comprises:
   detecting a first unit of the input from the user;
   moving of the point-of-view at the first speed in response to the first unit of the input from the user;
   moving the point-of-view at the second speed in response to the first unit of the input;
   detecting a second unit of the input from the user prior to completion of the moving of the point-of-view at the first speed or the second speed; and
   moving the point-of-view at the first speed in response to receiving of the second unit of the input after moving the point-of-view at the second speed in response to the first unit of the input.

8. The method according to claim 1, wherein the moving of the point-of-view further comprises:
   detecting a first unit of the input from the user;
   moving of the point-of-view at the second speed in response to the unit of the first input from the user;
   detecting a second unit of the input from the user prior to completion of the moving of the point-of-view at the second speed;
   stopping moving of the point-of-view at the second speed in response to the unit of the first input; and
   moving the point-of-view at the first speed in response to receiving of the second unit of the input.

9. The method according to claim 1, wherein the moving of the point-of-view comprises:
   detecting a first unit of the input from the user;
   moving of the point-of-view at the first speed in response to a first unit of the input from the user;
   moving the point-of-view at the second speed in response to the first unit of the input;
   halting the moving of the point-of-view after moving the point-of-view at the second speed in response to the first input; and
   detecting a second unit of the input from the user after completion of the moving of the point-of-view at the second speed; and
   moving of the point-of-view at the first speed in response to the second unit of the input.

10. The method according to claim 1, further comprising detecting a motion of the head-mounted device,
    wherein the moving of the point-of-view at the first speed and the moving of the field of view at the second speed are based on the detected motion.

11. The method according to claim 1, further comprising detecting a motion of the user,
    wherein the moving of the point-of-view at the first speed and the moving of the field of view at the second speed are based on the detected motion.

12. The method according to claim 1, wherein the moving of the point-of-view at the first speed comprises moving the virtual camera in the virtual space at the first speed.

13. The method according to claim 1, wherein the moving of the point-of-view at the second speed comprises moving the virtual camera in the virtual space at the second speed.

14. A system comprising:
a head-mounted device;
a non-transitory computer readable medium for storing application information; and
a processor connected to the non-transitory computer readable medium, wherein the processor is configured to execute the stored application information for:
defining a virtual space including a point-of-view;
providing instructions for displaying on the head-mounted device a field of view of the virtual space based on a location of the point-of-view in the virtual space; and
detecting a unit of an input from a user;
moving the point-of-view at a first speed in response to the detected unit of the input;
updating the image displayed on the head-mounted device in accordance with the first speed;
moving the point-of-view at a second speed slower than the first speed in response to the detected unit of the input;
updating the image displayed on the head-mounted device in accordance with the second speed.

15. The system according to claim 14, wherein the processor is configured to detect the unit of the input based on a time duration for which the input is detected.

16. The system according to claim 14, wherein processor is configured to provide the instructions for:
detecting a first unit of the input from the user;
moving of the point-of-view at the first speed in response to the first unit of the input from the user;
moving the point-of-view at the second speed in response to the first unit of the input;
detecting a second unit of the input from the user prior to completion of the moving of the point-of-view at the first speed or the second speed; and
moving the point-of-view at the first speed in response to receiving of the second unit of the input after moving the point-of-view at the second speed in response to the first unit of the input.

17. The system according to claim 15, wherein the processor is configured to provide the instructions for:
detecting a first unit of the input from the user;
moving of the point-of-view at the second speed in response to the unit of the first input from the user;
detecting a second unit of the input from the user prior to completion of the moving of the point-of-view at the second speed;
stopping moving of the point-of-view at the second speed in response to the unit of the first input; and
moving the point-of-view at the first speed in response to receiving of the second unit of the input.

18. The system according to claim 15, wherein processor is configured to provide the instructions for:
detecting a first unit of the input from the user;
moving of the point-of-view at the first speed in response to a first unit of the input from the user;
moving the point-of-view at the second speed in response to the first unit of the input;
halting the moving of the point-of-view after moving the point-of-view at the second speed in response to the first input; and
detecting a second unit of the input from the user after completion of the moving of the point-of-view at the second speed; and
moving of the point-of-view at the first speed in response to the second unit of the input.

19. A non-transitory computer readable medium configured to store application information for execution by a processor for:
defining a virtual space including a point-of-view;
providing instructions for displaying on a head-mounted device a field of view of the virtual space based on a location of the point-of-view in the virtual space; and
detecting a unit of an input from a user;
moving the point-of-view at a first speed in response to the detected unit of the input;
updating the image displayed on the head-mounted device in accordance with the first speed;
moving the point-of-view at a second speed slower than the first speed in response to the detected unit of the input;
updating the image displayed on the head-mounted device in accordance with the second speed.

* * * * *